(12) United States Patent
Beauchamp et al.

(10) Patent No.: US 8,961,790 B2
(45) Date of Patent: *Feb. 24, 2015

(54) SEPARATOR ASSEMBLY

(75) Inventors: Philip Paul Beauchamp, Rexford, NY (US); Michael Kent Cueman, Yorktown, VA (US); Daniel Jason Erno, Clifton Park, NY (US); Todd Alan Anderson, Niskayuna, NY (US); Dean David Marschke, Eden Prairie, MN (US)

(73) Assignee: General Electric Company, Niskayuna, NY (US)

( * ) Notice: Subject to any disclaimer, the term of this patent is extended or adjusted under 35 U.S.C. 154(b) by 878 days.

This patent is subject to a terminal disclaimer.

(21) Appl. No.: 13/172,427

(22) Filed: Jun. 29, 2011

(65) Prior Publication Data
US 2012/0160758 A1 Jun. 28, 2012

Related U.S. Application Data

(63) Continuation-in-part of application No. 12/330,536, filed on Dec. 9, 2008, now abandoned, and a continuation-in-part of application No. 13/149,448,
(Continued)

(51) Int. Cl.
*B01D 63/06* (2006.01)
*B01D 63/10* (2006.01)
(Continued)

(52) U.S. Cl.
CPC .............. *B01D 63/10* (2013.01); *B01D 63/103* (2013.01); *C02F 1/441* (2013.01); *B01D 2313/10* (2013.01); *B01D 2313/12* (2013.01); *C02F 2103/08* (2013.01)
USPC .. 210/321.72; 96/8; 210/321.74; 210/321.76; 210/321.88; 210/321.89

(58) Field of Classification Search
CPC ...... B01D 63/00; B01D 63/066; B01D 63/10; B01D 63/12; B01D 63/103; B01D 2311/165; B01D 2313/08; B01D 2313/10; B01D 2313/12; B01D 2313/14; B01D 2313/146
USPC ............... 210/321.6, 321.72–321.76, 321.79, 210/321.8, 321.83–321.85, 321.88, 321.89, 210/500.23; 96/7–11
See application file for complete search history.

(56) References Cited

U.S. PATENT DOCUMENTS 3,386,583 A * 6/1968 Merten ................... 210/321.83
3,397,790 A * 8/1968 Navoy et al. ............. 210/321.83
(Continued)

FOREIGN PATENT DOCUMENTS

AU 16064 12/1971
DE 2055511 A1 6/1971
(Continued)

*Primary Examiner* — Joseph Drodge
(74) *Attorney, Agent, or Firm* — Andrew J. Caruso

(57) ABSTRACT

A novel separator assembly for a spiral flow reverse osmosis apparatus is provided. In one embodiment, the separator assembly comprises a central core element comprising at least one permeate exhaust conduit and at least one concentrate exhaust conduit. Each exhaust conduit defines an exhaust channel and one or more openings allowing fluid communication between an exterior surface of the exhaust conduit and the exhaust channel, said exhaust conduits independently defining a cavity between said conduits. The cavity is configured to accommodate a first portion of a membrane stack assembly comprising at least one feed carrier layer, at least one permeate carrier layer, and at least one membrane layer. A first portion of the membrane stack assembly is disposed within the cavity, and a second portion of the membrane stack assembly is wound around the central core element and forms a multilayer membrane assembly disposed around the central core element.

14 Claims, 26 Drawing Sheets

Related U.S. Application Data filed on May 31, 2011, and a continuation-in-part of application No. 13/157,705, filed on Jun. 10, 2011.

(60) Provisional application No. 61/106,219, filed on Oct. 17, 2008, provisional application No. 61/111,366, filed on Nov. 5, 2008.

(51) Int. Cl.
  *B01D 63/12* (2006.01)
  *C02F 1/44* (2006.01)
  *C02F 103/08* (2006.01)

(56) References Cited

U.S. PATENT DOCUMENTS

| | | |
|---|---|---|
| 3,554,378 A | 1/1971 | Kohl |
| 3,668,837 A | 6/1972 | Gross |
| 3,722,694 A * | 3/1973 | Agranat ............ 210/321.89 |
| 3,933,646 A | 1/1976 | Kanamaru et al. |
| 3,962,095 A | 6/1976 | Luppi |
| 3,966,616 A | 6/1976 | Bray |
| 4,083,780 A | 4/1978 | Call |
| 4,770,777 A | 9/1988 | Steadly et al. |
| 4,834,881 A | 5/1989 | Sawada et al. |
| 4,950,404 A | 8/1990 | Chau |
| 4,973,408 A | 11/1990 | Keefer |
| 5,034,126 A | 7/1991 | Reddy et al. |
| 5,114,582 A * | 5/1992 | Sandstrom et al. ...... 210/321.74 |
| 5,207,916 A | 5/1993 | Goheen et al. |
| 5,470,469 A | 11/1995 | Eckman |
| 5,498,338 A | 3/1996 | Kruger et al. |
| 5,580,452 A | 12/1996 | Lin |
| 5,733,602 A | 3/1998 | Hirose et al. |
| 5,858,229 A | 1/1999 | Uemura et al. |
| 6,068,771 A * | 5/2000 | McDermott et al. ...... 210/321.83 |
| 6,368,507 B1 | 4/2002 | Koo et al. |
| 7,063,789 B2 | 6/2006 | Colby et al. |
| 8,021,550 B2 * | 9/2011 | Beauchamp et al. .... 210/321.85 |
| 2005/0029192 A1 * | 2/2005 | Arnold et al. ................. 210/641 |
| 2008/0197069 A1 | 8/2008 | Binkle et al. |
| 2010/0096308 A1 | 4/2010 | Beauchamp et al. |
| 2010/0096309 A1 | 4/2010 | Beauchamp et al. |
| 2010/0096319 A1 | 4/2010 | Beauchamp et al. |

FOREIGN PATENT DOCUMENTS

| | | |
|---|---|---|
| DE | 20209511 U1 | 9/2002 |
| EP | 0383146 B1 | 12/1993 |
| GB | 1435985 | 5/1976 |
| JP | 06246125 A1 | 9/1994 |
| WO | WO9823361 A1 | 6/1998 |
| WO | WO0078436 A1 | 12/2000 |
| WO | WO2005070524 A1 | 8/2005 |

* cited by examiner

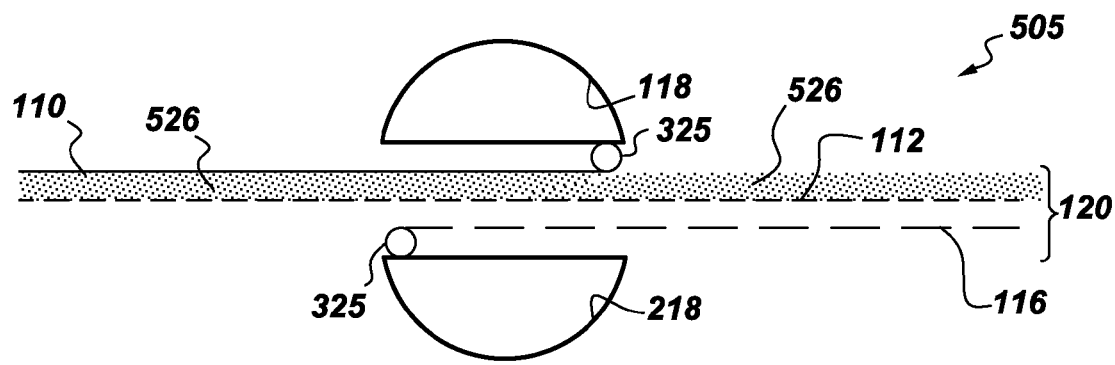
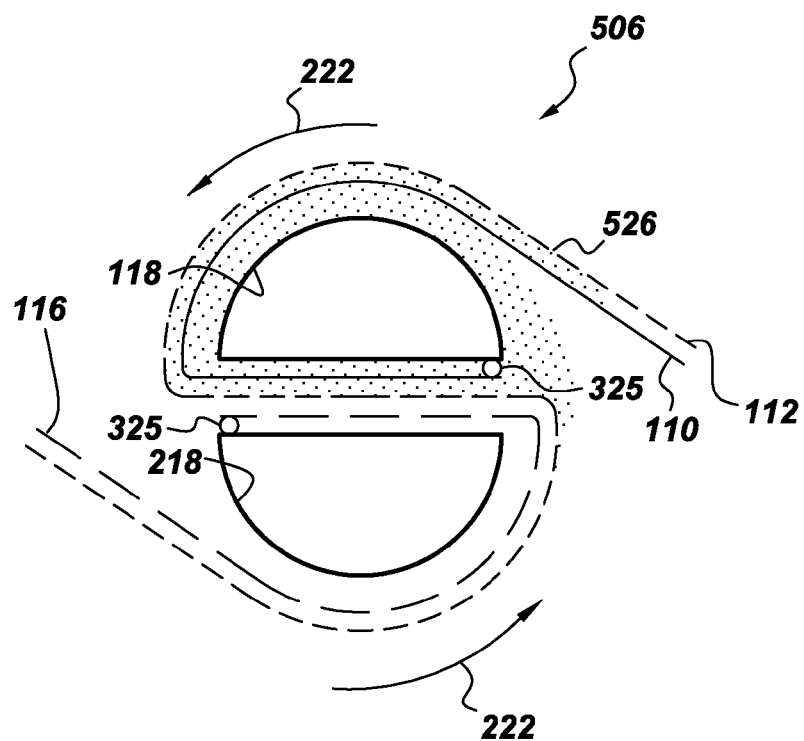
Fig. 5B

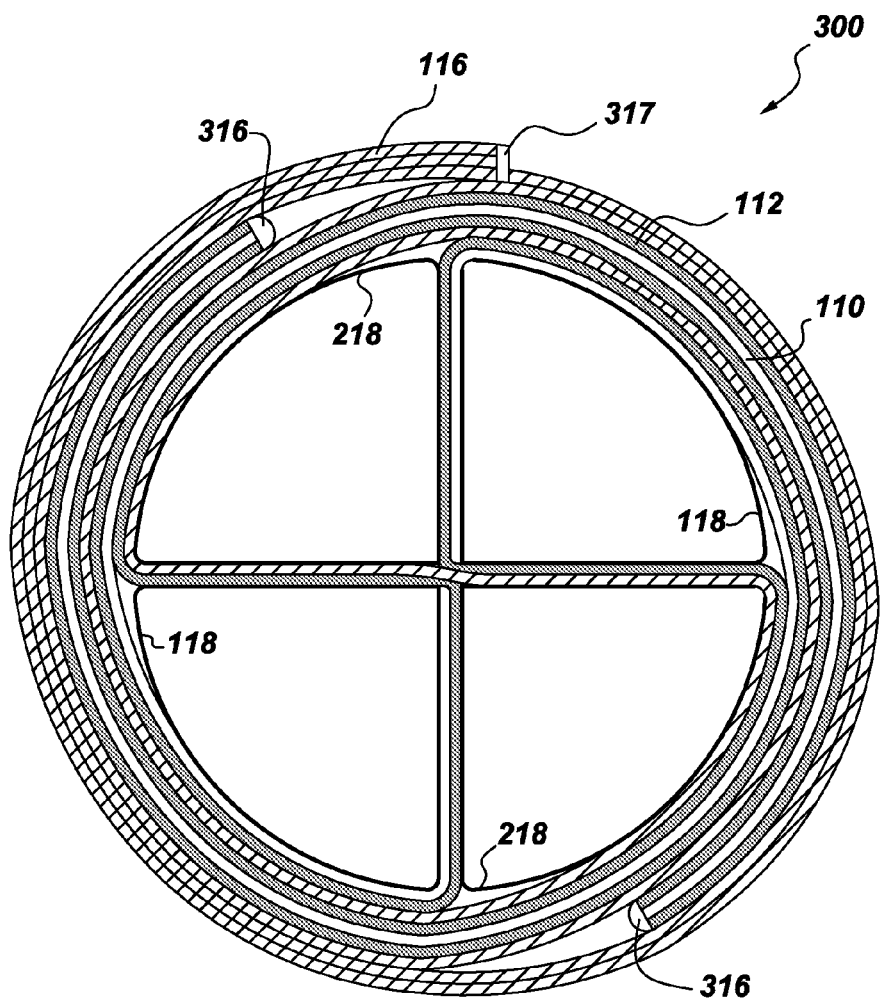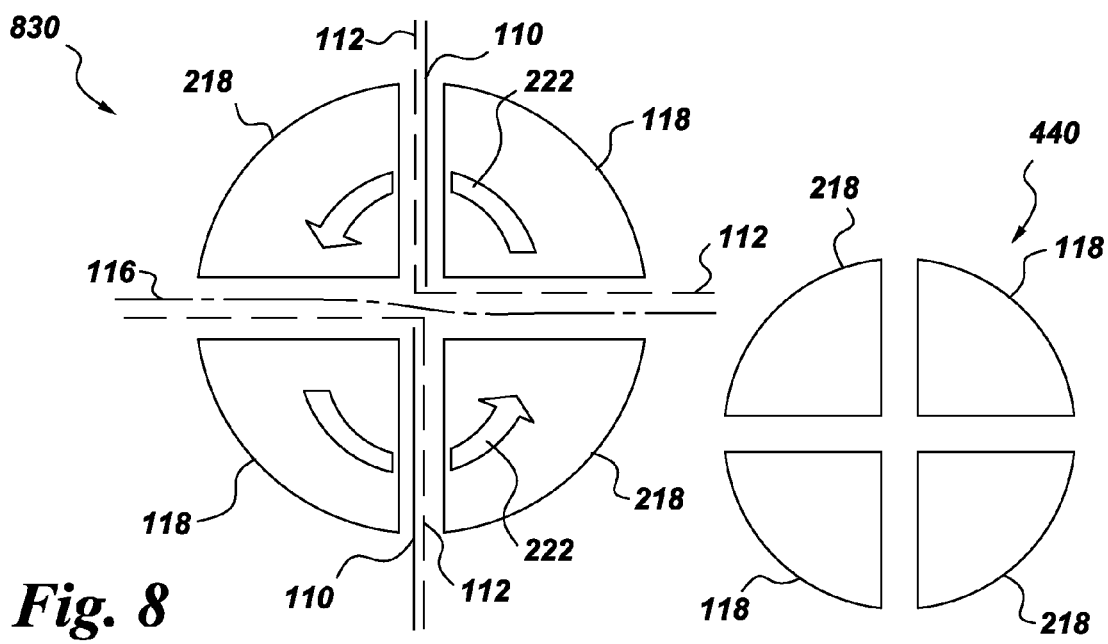
Fig. 8

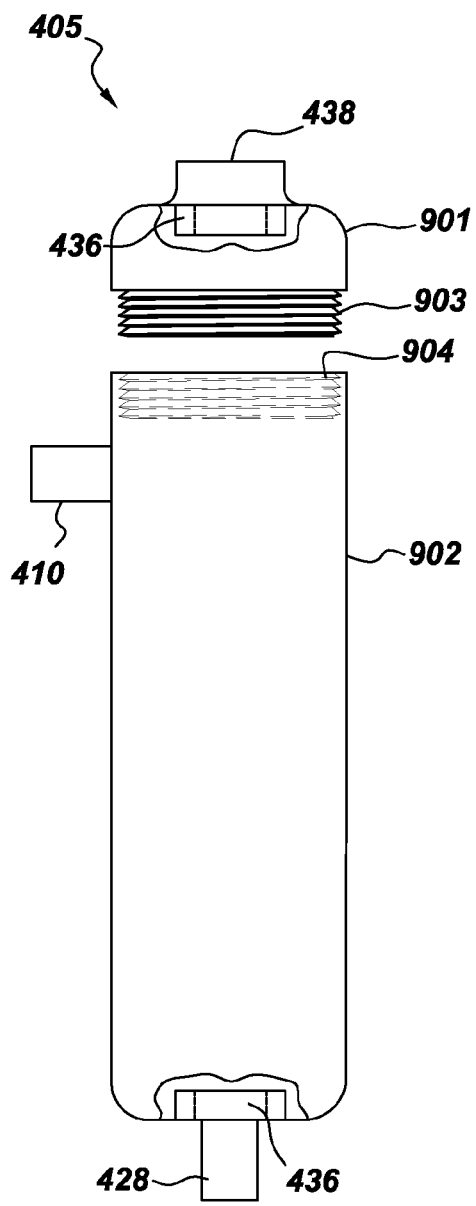
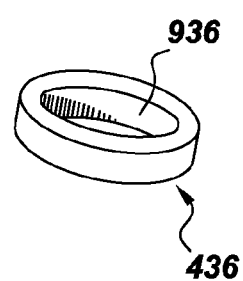
Fig. 9A
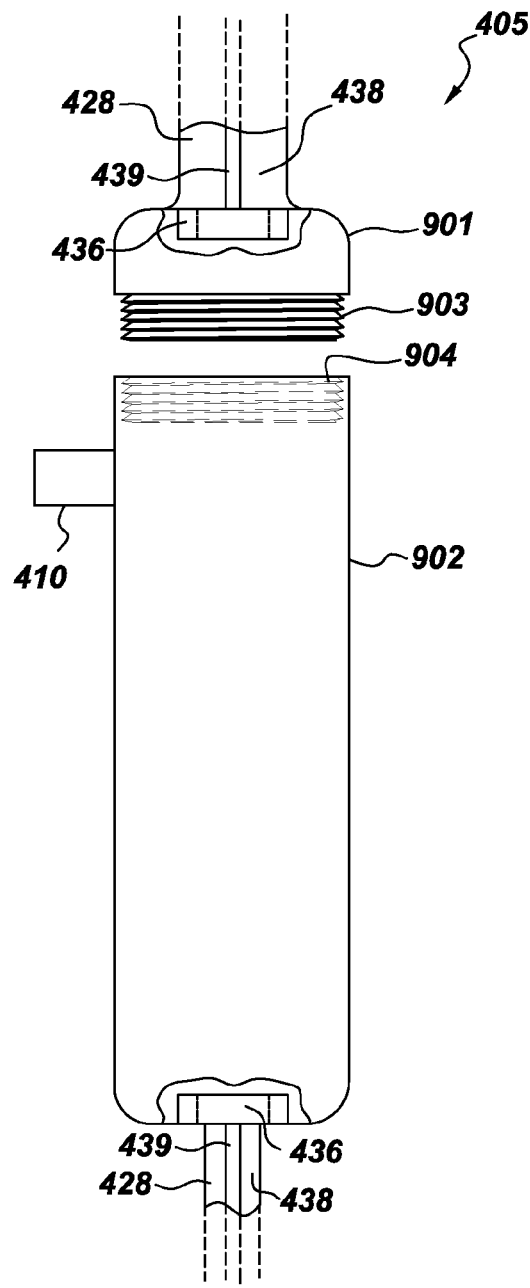
Fig. 9B

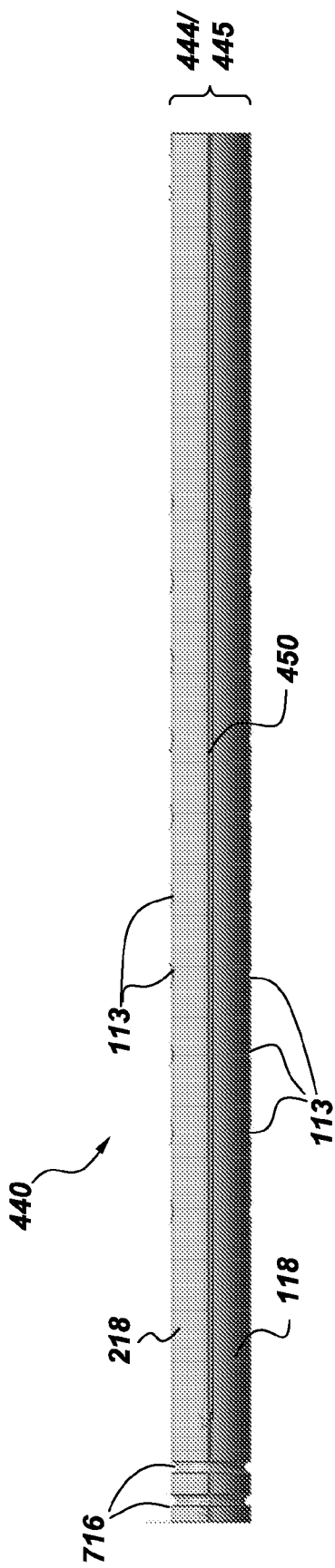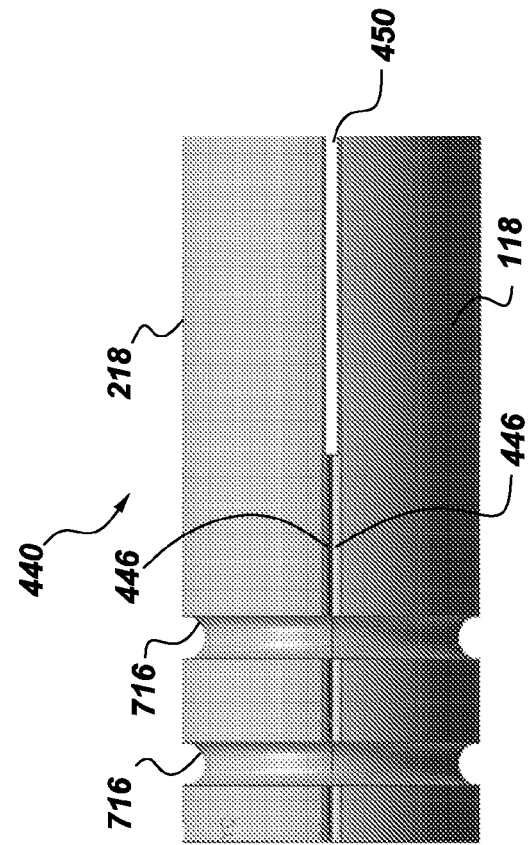
Fig. 10B
Fig. 10C

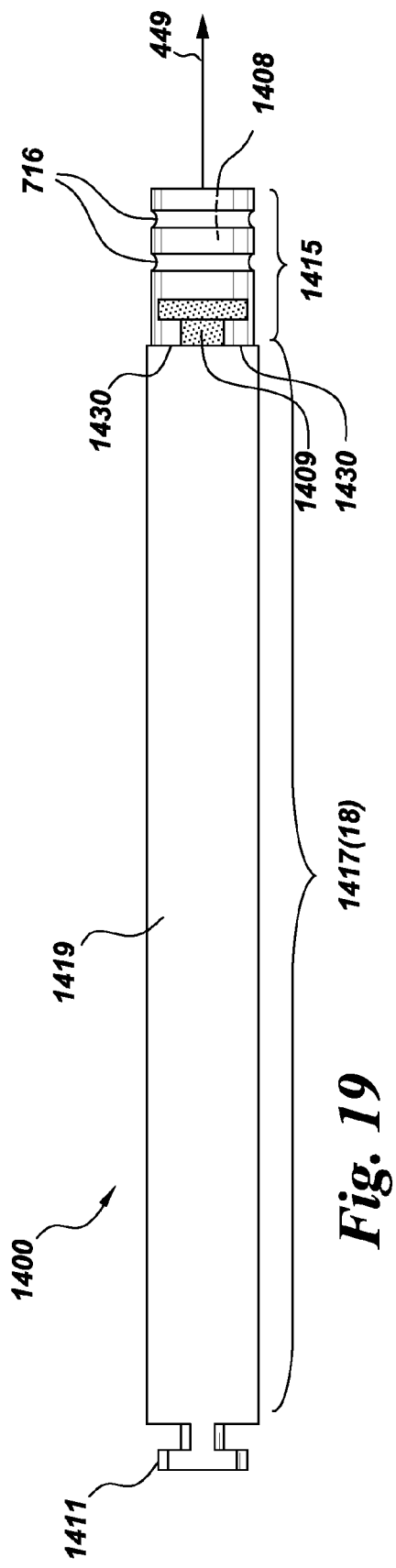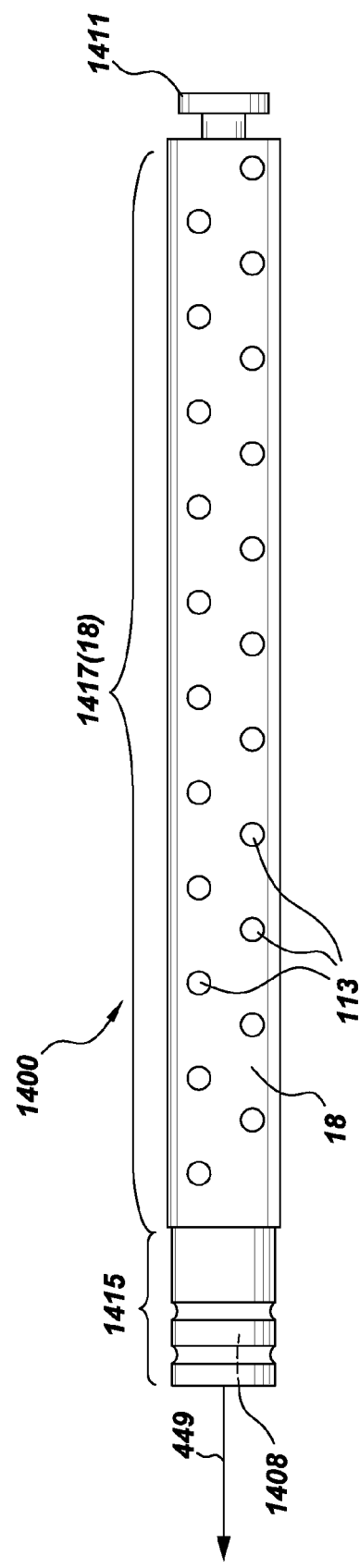

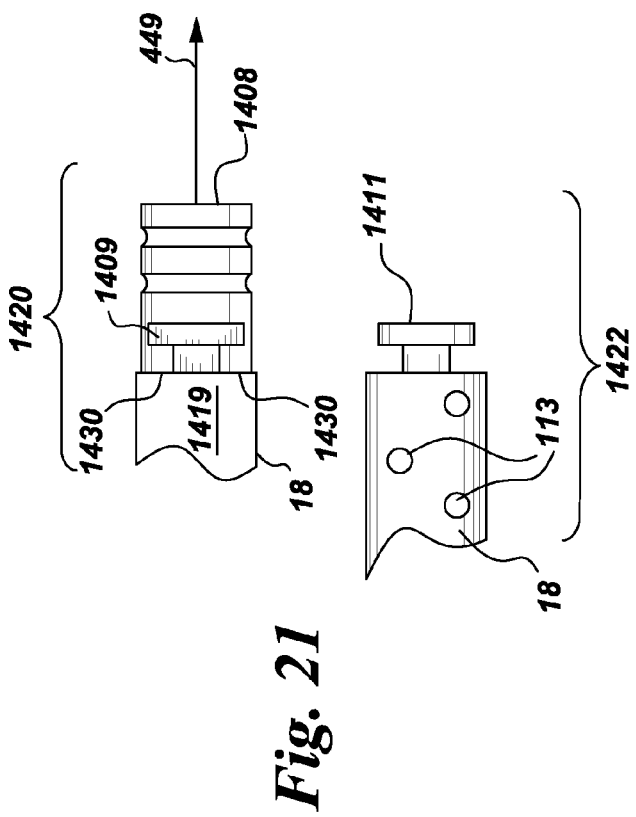
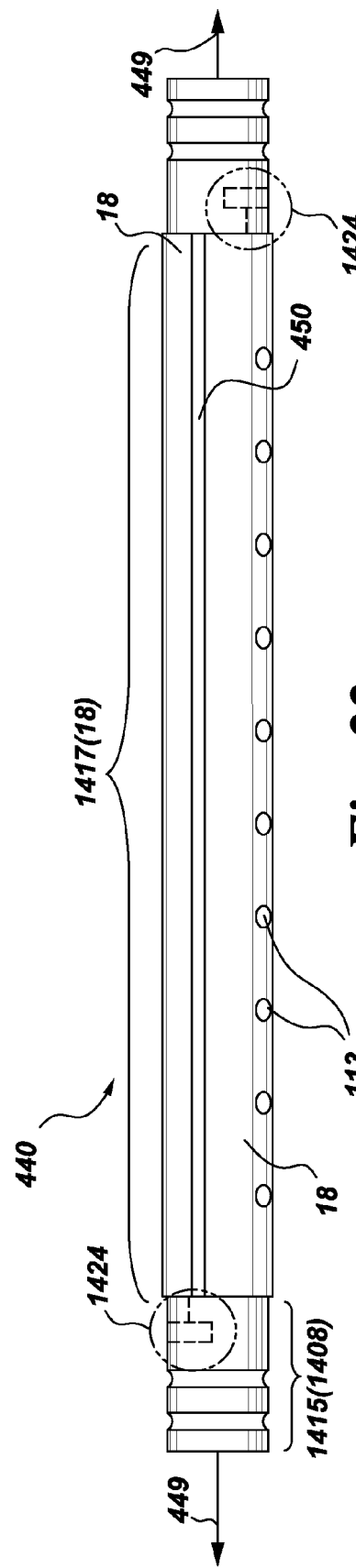

SEPARATOR ASSEMBLY

CROSS REFERENCE TO RELATED APPLICATIONS

This Application claims the benefit of and is a Continuation-In-Part of U.S. patent application Ser. No. 12/330,536 filed Dec. 9, 2008, said U.S. patent application claiming priority to U.S. Provisional Application No. 61/106,219 filed Oct. 17, 2008 and U.S. Provisional Application No. 61/111,366 filed Nov. 5, 2008, and further claims the benefit of and is a Continuation-In-Part of U.S. patent application Ser. No. 13/149,448 filed May 31, 2011 and U.S. patent application Ser. No. 13/157,705 filed Jun. 10, 2011; each of which named applications and Provisional Application is herein incorporated by reference in its entirety. Where subject matter present in any of the matter incorporated by reference is in conflict with subject matter in the present application, the present application will be considered authoritative.

BACKGROUND

This invention includes embodiments that generally relate to separator assemblies. In various embodiments, the invention relates to spiral flow separator assemblies. The invention also includes methods for making separator assemblies.

Conventional separator assemblies typically comprise a folded multilayer membrane assembly disposed around a porous exhaust conduit. The folded multilayer membrane assembly comprises a feed carrier layer in fluid contact with the active-surface of a membrane layer having an active surface and a passive surface. The folded multilayer membrane assembly also comprises a permeate carrier layer in contact with the passive surface of the membrane layer and a porous exhaust conduit. The folded membrane layer structure ensures contact between the feed carrier layer and the membrane layer without bringing the feed carrier layer into contact with the permeate carrier layer or the porous exhaust conduit. During operation, a feed solution containing a solute is brought into contact with the feed carrier layer of the multilayer membrane assembly which transmits the feed solution to the active surface of the membrane layer which modifies and transmits a portion of the feed solution as a permeate to the permeate carrier layer. The feed solution also serves to disrupt solute accretion at the active surface of the membrane layer and transport excess solute out of the multilayer membrane assembly. The permeate passes via the permeate carrier layer into the porous exhaust conduit which collects the permeate. Separator assemblies comprising folded multilayer membrane assemblies have been used in various fluid purification processes, including reverse osmosis, ultrafiltration, and microfiltration processes.

Folded multilayer membrane assemblies may be manufactured by bringing the active surface of a membrane layer having an active surface and a passive surface into contact with both surfaces of a feed carrier layer, the membrane layer being folded to create a pocket-like structure which envelops the feed carrier layer. The passive surface of the membrane layer is brought into contact with one or more permeate carrier layers to produce a membrane stack assembly in which the folded membrane layer is disposed between the feed carrier layer and one or more permeate carrier layers. A plurality of such membrane stack assemblies, each in contact with at least one common permeate carrier layer, is then wound around a porous exhaust conduit in contact with the common permeate carrier layer to provide the separator assembly comprising the multilayer membrane assembly and the porous exhaust conduit. The edges of the membrane stack assemblies are appropriately sealed to prevent direct contact of the feed solution with the permeate carrier layer. A serious weakness separator assemblies comprising a folded multilayer membrane assembly is that the folding of the membrane layer may result in loss of membrane function leading to uncontrolled contact between the feed solution and the permeate carrier layer.

Thus, there exists a need for further improvements in both the design and manufacture of separator assemblies comprising one or more multilayer membrane assemblies. Particularly in the realm of water purification for human consumption, there is a compelling need for more robust and reliable separator assemblies which are both efficient and cost effective.

BRIEF DESCRIPTION

In one embodiment, the present invention provides a separator assembly comprising (a) a central core element comprising at least one permeate exhaust conduit and at least one concentrate exhaust conduit, each of said exhaust conduits defining an exhaust channel and one or more openings which allow fluid communication between an exterior surface of the exhaust conduit and the exhaust channel, said exhaust conduits comprising at least one spacer element defining a cavity between said exhaust conduits, said cavity being configured to accommodate a first portion of a membrane stack assembly; and (b) a membrane stack assembly comprising at least one feed carrier layer, at least one permeate carrier layer, and at least one membrane layer; wherein said first portion of the membrane stack assembly is disposed within the cavity defined by the exhaust conduits, and wherein a second portion of the membrane stack assembly forms a multilayer membrane assembly disposed around the central core element.

In yet another embodiment, the present invention provides a separator assembly comprising (a) a central core element comprising at least one permeate exhaust conduit and at least one concentrate exhaust conduit, each of said exhaust conduits defining an exhaust channel and one or more openings which allow fluid communication between an exterior surface of the exhaust conduit and the exhaust channel, said exhaust conduits independently defining a cavity between said exhaust conduits, said cavity being configured to accommodate a first portion of a membrane stack assembly; and (b) a membrane stack assembly comprising at least one feed carrier layer, at least one permeate carrier layer, and at least one membrane layer; wherein said first portion of the membrane stack assembly is disposed within the cavity defined by the exhaust conduits, and wherein a second portion of the membrane stack assembly forms a multilayer membrane assembly disposed around the central core element.

In yet another embodiment, the present invention provides a separator assembly comprising (a) a central core element comprising at least two identical core element components, each of said core element components comprising at least one exhaust conduit and at least one friction coupling, said friction couplings being configured to join said core element components to form a central core element defining a cavity configured to accommodate a first portion of a membrane stack assembly; and (b) a membrane stack assembly comprising at least one feed carrier layer, at least one permeate carrier layer, and at least one membrane layer; wherein said first portion of the membrane stack assembly is disposed within the cavity defined by the central core element, wherein a second portion of the membrane stack assembly forms a multilayer membrane assembly disposed around the central core element, and wherein the core element components comprise at least one permeate exhaust conduit and at least one concentrate exhaust conduit.

In yet another embodiment, the present invention provides a separator assembly comprising (a) a central core element comprising two identical core element components, each core element component comprising a first section defining an exit cavity and second section comprising an exhaust conduit, each core element component comprising a first friction coupling and a second friction coupling joining the two core element components and defining a cavity between the exhaust conduits configured to accommodate a first portion of a membrane stack assembly; and (b) a membrane stack assembly comprising at least one feed carrier layer, at least one permeate carrier layer, and at least one membrane layer; wherein said first portion of the membrane stack assembly is disposed within the cavity defined by the central core element, wherein a second portion of the membrane stack assembly forms a multilayer membrane assembly disposed around the central core element, and wherein the core element components comprise at least one permeate exhaust conduit and at least one concentrate exhaust conduit.

In another embodiment, the present invention provides a spiral flow reverse osmosis apparatus comprising: (a) a pressurizable housing; and (b) a separator assembly comprising: (i) a central core element comprising at least one permeate exhaust conduit and at least one concentrate exhaust conduit, each of said permeate exhaust conduit and concentrate exhaust conduit defining an exhaust channel and one or more openings which allow fluid communication between an exterior surface of the exhaust conduit and the exhaust channel, said permeate exhaust conduit and said concentrate exhaust conduit comprising at least one spacer element defining a cavity between said permeate exhaust conduit and said concentrate exhaust conduit, said cavity being configured to accommodate a first portion of a membrane stack assembly; and (ii) a membrane stack assembly comprising at least one feed carrier layer, at least one permeate carrier layer, and at least one membrane layer; wherein said first portion of the membrane stack assembly is disposed within said cavity, and wherein a second portion of the membrane stack assembly forms a multilayer membrane assembly disposed around the central core element.

These and other features, aspects, and advantages of the present invention may be understood more readily by reference to the following detailed description.

BRIEF DESCRIPTION OF DRAWINGS

These and other features, aspects, and advantages of the present invention will become better understood when the following detailed description is read with reference to the accompanying drawings in which like characters may represent like parts throughout the drawings.

FIG. 5A, FIG. 5B and FIG. 5C illustrate a method of making a separator assembly in accordance with one or more embodiments of the present invention.

FIG. 8 illustrates a separator assembly in accordance with one or more embodiments of the present invention.

FIG. 9A and FIG. 9B illustrate pressurizable housings which may be used in accordance with one or more embodiments of the invention.

FIG. 10A, FIG. 10B and FIG. 10C illustrate a central core element which may be used in accordance with one or more embodiments of the present invention.

FIG. 19 illustrates a core element component which may be used in accordance with one or more embodiments of the invention.

FIG. 20 illustrates a core element component which may be used in accordance with one or more embodiments of the invention.

FIG. 21 illustrates core element components which may be used in accordance with one or more embodiments of the invention.

FIG. 22 illustrates a central core element which may be used in accordance with one or more embodiments of the invention.

DETAILED DESCRIPTION

Figure 1:
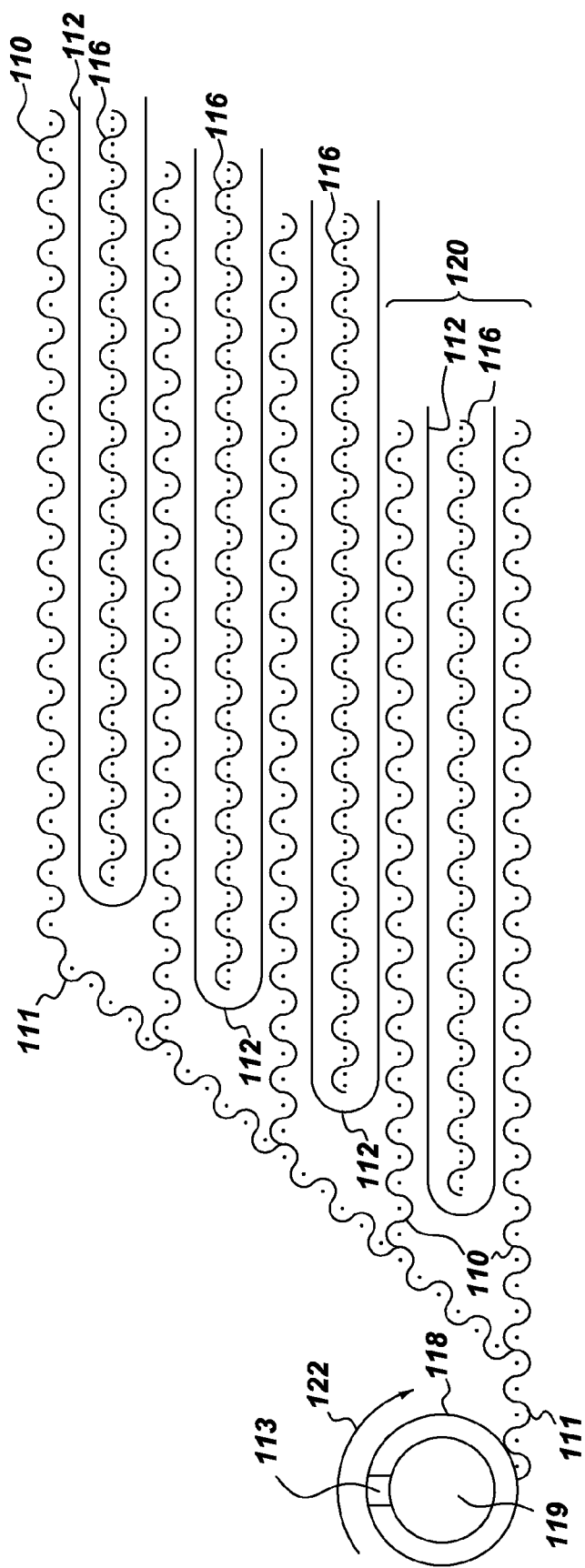
FIG. 1 illustrates the components of a conventional separator assembly and method of its assembly.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one embodiment, the present invention provides a separator assembly comprising a central core element and a membrane stack assembly. The central core element comprises at least one permeate exhaust conduit and at least one concentrate exhaust conduit. Permeate exhaust conduits and concentrate exhaust conduits may be referred to individually and/or collectively as porous exhaust conduits or simply as exhaust conduits. Each of the exhaust conduits defines an exhaust channel and one or more openings which allow fluid communication between an exterior surface of the exhaust conduit and the exhaust channel. These openings are perforations in an exterior surface of the exhaust conduit and are distinct from an open terminus of the exhaust channel defined by the exhaust conduit and through which, during operation, permeate or concentrate exits the exhaust channel. The exterior surface of a permeate exhaust conduit in which the openings are defined is in direct contact with a permeate carrier layer comprised by the membrane stack assembly. During operation, permeate passes from the permeate carrier layer through these openings and into the exhaust channel defined by the permeate exhaust conduit. Similarly, the exterior surface of a concentrate exhaust conduit in which the openings are defined is in direct contact with a feed carrier layer comprised by the membrane stack assembly. During operation, concentrate passes from the feed carrier layer through these openings and into the exhaust channel defined by the concentrate exhaust conduit. The membrane stack assembly comprises at least one feed carrier layer, at least one permeate carrier and at least one membrane layer. In various embodiments of the present invention, the exhaust conduits define a cavity between themselves which is configured to accommodate a first portion of a membrane stack assembly. This cavity may be defined by one or more spacer elements which form a part of the exhaust conduit, or as in the case of the embodiments shown in FIG. 15A-C, and FIGS. 16-22, by a first section of a core element component attached to a second section of the same core element component comprising the exhaust conduit. (More will be said about this in due course and figures provided herein illustrate a number of embodiments of the invention featuring a central core element comprising a plurality of core element components having a first section and a second section.) While in certain of the figures presented in this disclosure exhaust conduits may appear to be separated by a first portion of the membrane stack assembly disposed between them, it is emphasized that the various central core elements used in accordance with the invention all define at least one cavity configured to accommodate a first portion of a membrane stack assembly, and this cavity is defined independently of the membrane stack assembly or any structure apart from the central core element itself. A second portion of the membrane stack assembly forms a multilayer membrane assembly disposed around the central core element. The first portion of the membrane stack assembly is disposed within one or more cavities defined by the central core element and the second portion of the membrane stack assembly is disposed around the central core element such that no feed carrier layer is in contact with a permeate exhaust conduit, and such that no permeate carrier layer is in contact with a concentrate exhaust conduit.

As noted, the central core element comprises at least one permeate exhaust conduit and at least one concentrate exhaust conduit. In general, an exhaust conduit may be a permeate exhaust conduit or a concentrate exhaust conduit depending on which layer of the membrane stack assembly it is in contact with. A layer is "in contact" with an exhaust conduit when the layer is configured to permit transfer of fluid from the layer into the conduit without passing through an intervening membrane layer. A permeate exhaust conduit is in contact with a permeate carrier layer surface (or in certain embodiments a membrane layer surface) in such a way that permeate may pass from the permeate carrier layer into the permeate exhaust conduit. A concentrate exhaust conduit must be in contact with a concentrate carrier layer (at times herein referred to as a feed carrier layer) surface in such a way that concentrate may pass from the concentrate carrier layer into the concentrate exhaust conduit. Each exhaust conduit is typically a porous tube running the length of the separator assembly, although other configurations may fall within the meaning of the term exhaust conduit, for example a longitudinally grooved structure, which structure may or may not be cylindrical, running the length of the separator assembly. Suitable porous tubes which may serve as the permeate exhaust conduit include perforated metal tubes, perforated plastic tubes, perforated ceramic tubes and the like. In one embodiment, the exhaust conduits are not perforated but are sufficiently porous to allow passage of fluid from the permeate carrier layer or the feed carrier layer into the interior of the exhaust conduit. Fluid flowing through the permeate carrier layer is at times herein referred to as "permeate" or "the permeate". Permeate passes from a portion of the permeate carrier layer in contact with the permeate exhaust conduit through perforations in the permeate exhaust conduit and into the exhaust channel defined by the permeate exhaust conduit. This channel may at times herein be referred to as the "permeate exhaust channel" or simply as the "exhaust channel". Similarly, fluid flowing through the feed carrier layer is at times herein referred to as "feed" or "concentrate" or "brine". Those of ordinary skill in the art will appreciate that a fluid designated "feed" serves as a precursor of "concentrate" or "brine". Concentrate passes from a portion of the feed carrier layer in contact with the concentrate exhaust conduit through perforations in the concentrate exhaust conduit and into the exhaust channel defined by the concentrate exhaust conduit. This channel may at times herein be referred to as the "concentrate exhaust channel" or simply as the "exhaust channel". In one embodiment, the central core element which may be used in accordance with the invention comprises two porous exhaust conduits each of which is a porous half-cylinder shaped tube. In an alternate embodiment, the central core element comprises two porous exhaust conduits each of which is a porous half-octagon shaped tube. In another embodiment, the central core element comprises two porous exhaust conduits each of which is a porous half-decahedron shaped tube. In yet another embodiment, the central core element comprises two porous exhaust conduits each of which is a porous half-tetradecahedron shaped tube. In one embodiment, the central core element comprises at least two permeate exhaust conduits and at least two concentrate exhaust conduits. In one embodiment, the central core element comprises at least two permeate exhaust conduits at least one of which is a porous teardrop shaped tube. The porous exhaust conduits may at each occurrence within a separator assembly have the same or different shapes. In one embodiment, the separator assembly comprises one or more porous exhaust conduits having a shape different from another porous exhaust conduit present in the same separator assembly. In another embodiment, all of the porous exhaust conduits present in a separator assembly have the same shape.

Figure 2A:
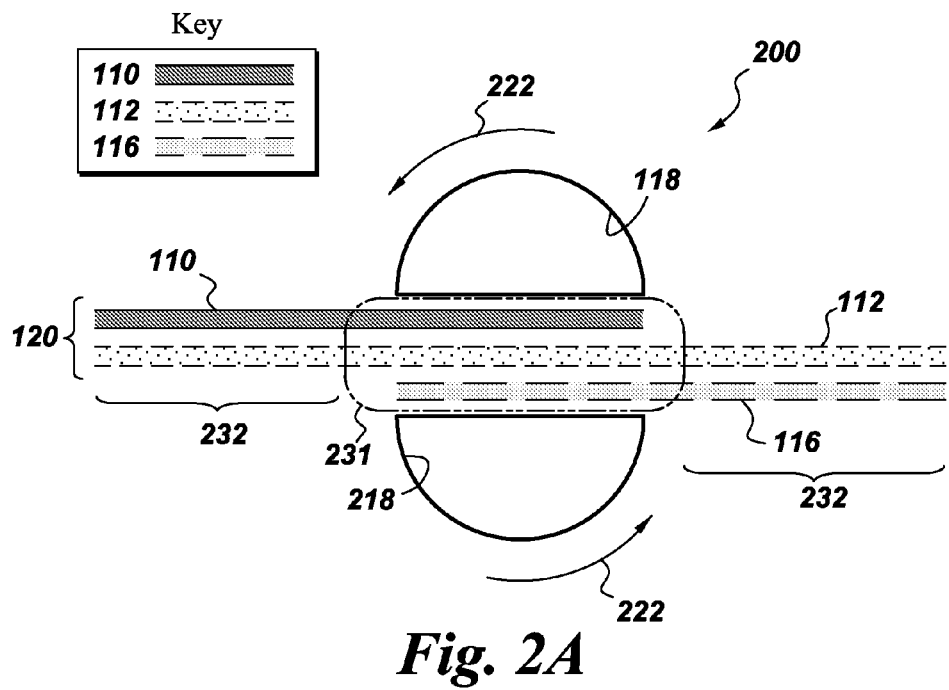
FIG. 2A, FIG. 2B and FIG. 2C illustrate a membrane stack assembly and central core element in accordance with one or more embodiments of the present invention.
Figure 2B:
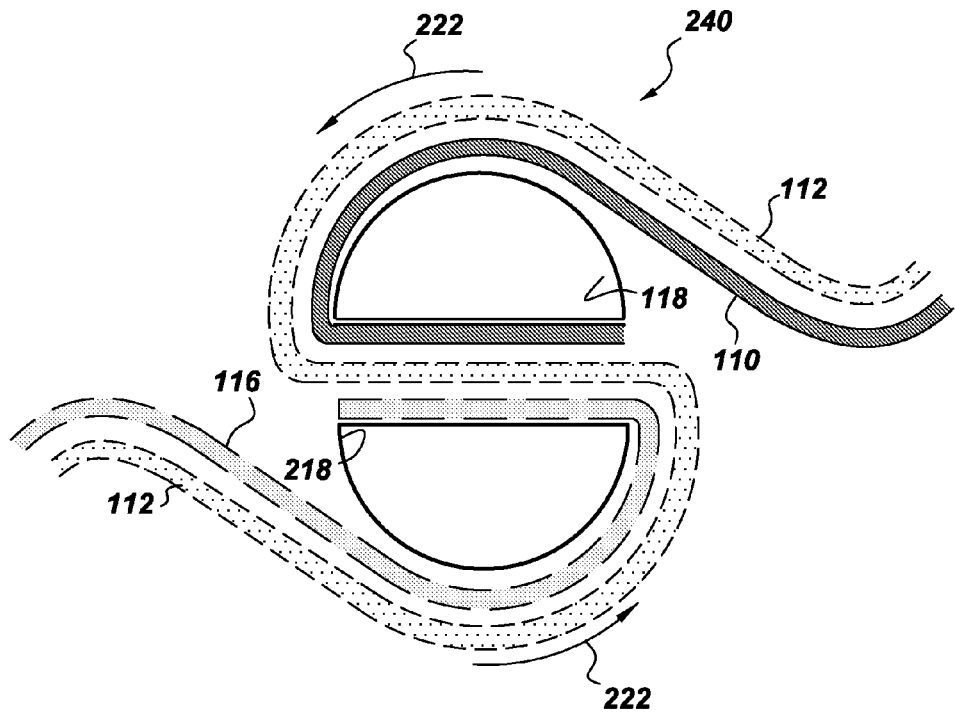
Figure 2C:
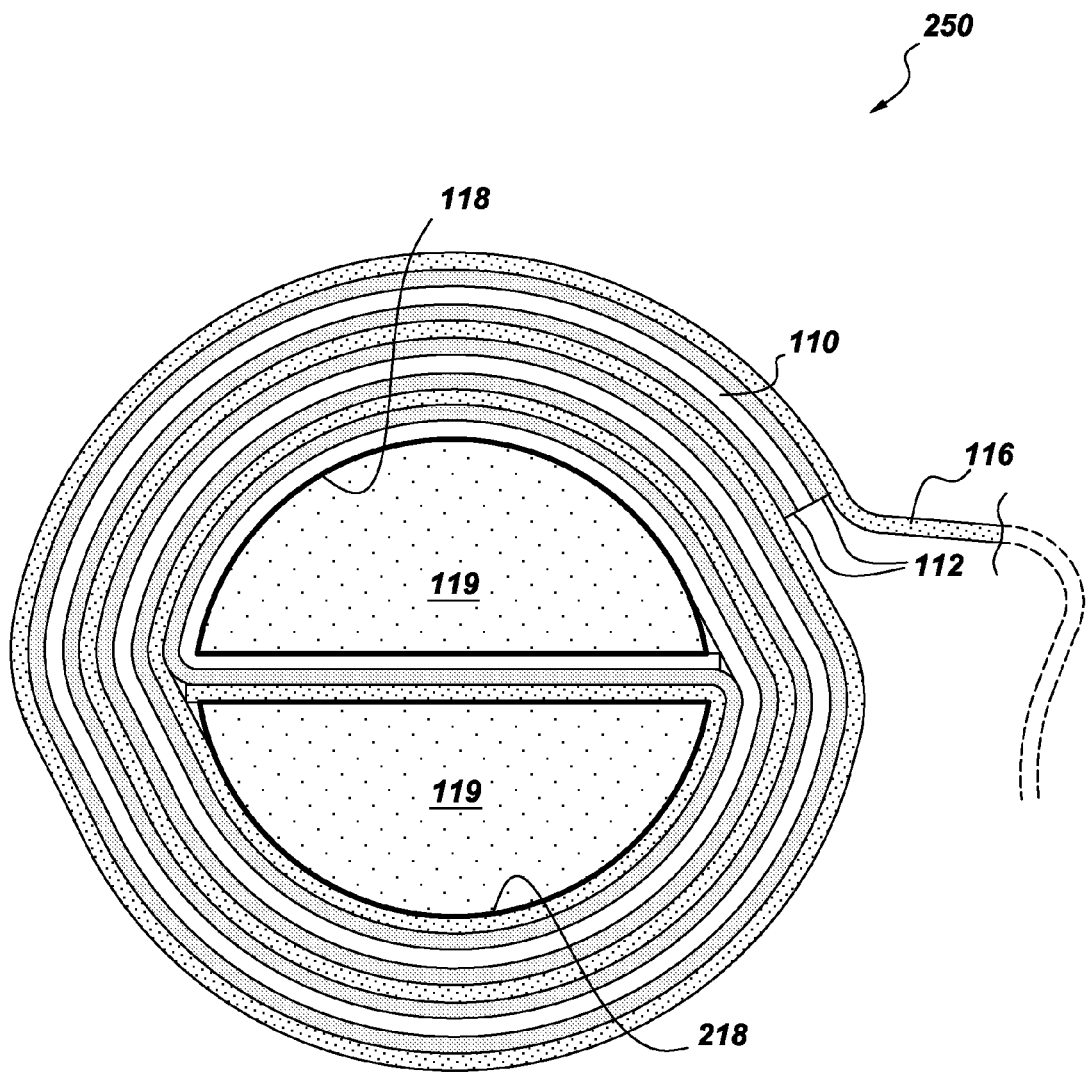

As used herein, the term "multilayer membrane assembly" refers to a second portion of the membrane stack assembly disposed around the central core element. FIG. 2A, FIG. 2B and FIG. 2C disclosed herein illustrate first and second portions (231 and 232) of the membrane stack assembly 120. In the embodiment shown, the multilayer membrane assembly is a combination of at least one feed carrier layer, at least one permeate carrier layer, and at least one membrane layer disposed around a central core element comprising at least one permeate exhaust conduit and at least one concentrate exhaust conduit.

In one embodiment, the multilayer membrane assembly may be formed by disposing a first portion (231, FIG. 2A) of a membrane stack assembly (120) within a cavity defined by the central core element and then rotating the central core element, thereby winding a second portion (232, FIG. 2A) of the membrane stack assembly around the central core element. As is disclosed in detail herein, the configuration of the membrane stack assembly and the disposing of the membrane stack assembly within the cavity defined by the central core element are such that upon winding of the membrane stack assembly around the central core element to provide a wound structure (e.g. FIG. 2C) and securing of the free ends of the membrane stack assembly after winding, a separator assembly comprising a multilayer membrane assembly disposed around the central core element is obtained (See FIG. 3). Those skilled in the art will appreciate the close relationship, in certain embodiments, between the membrane stack assembly and the multilayer membrane assembly, and that the membrane stack assembly is the precursor of the multilayer membrane assembly. It is convenient to regard the membrane stack assembly as "unwound" and the multilayer membrane assembly as "wound". It should be emphasized, however, that as defined herein a multilayer membrane assembly is not limited to the "wound" form of one or more membrane stack assemblies disposed within a central core element as other means of disposing the second portion of the membrane stack assembly around the central core element may become available. In various embodiments, the separator assembly provided by the present invention comprises a multilayer membrane assembly comprising a second portion of one or more membrane stack assemblies radially disposed around a central core element such that the component membrane layers of the multilayer membrane assembly are free of folds or creases. In various embodiments, the separator assembly provided by the present invention is characterized by a permeate carrier layer flow path length which is significantly shorter than the corresponding permeate carrier layer flow path length in a conventional separator assembly. The length of the permeate carrier layer flow path is an important factor affecting the magnitude of the pressure drop across the separator assembly during operation. Thus, one of the many advantages provided by the present invention is greater latitude in the selection of useful operating conditions. As will become apparent to those of ordinary skill in the art after reading this disclosure, the present invention also offers significant advantages in terms of ease and cost of manufacture of separator assemblies generally.

As noted, the membrane stack assembly and multilayer membrane assembly comprise at least one feed carrier layer (at times herein referred to as the concentrate carrier layer). Materials suitable for use as the feed carrier layer include flexible sheet-like materials through which a feed solution may flow. In various embodiments of the present invention, the feed carrier layer is configured such that flow of a feed solution through the feed carrier layer occurs along a spiral path within the separator assembly from points on a surface of the separator assembly (the "feed surface") where the feed carrier layer is in contact with the feed solution and terminating at a surface of the concentrate exhaust conduit where a concentrate emerges (the "concentrate surface") from the feed carrier layer and passes into the concentrate exhaust conduit. The feed carrier layer may comprise structures which promote turbulent flow at the surface of the membrane layer in contact with the feed carrier layer as a means of preventing excessive solute build-up (accretion) at the membrane surface. In one embodiment, the feed carrier layer is comprised of a perforated plastic sheet. In another embodiment, the feed carrier layer is comprised of a perforated metal sheet. In yet another embodiment, the feed carrier layer comprises a porous composite material. In yet another embodiment, the feed carrier layer is a plastic fabric. In yet another embodiment, the feed carrier layer is a plastic screen. The feed carrier layer may be comprised of the same material as the permeate carrier layer or a material different from that used for the permeate carrier layer. In various embodiments of the present invention the feed carrier layer is not in contact with an exhaust conduit of the separator assembly.

As noted, the membrane stack assembly and the multilayer membrane assembly comprise at least one permeate carrier layer. Materials suitable for use as the permeate carrier layer include flexible sheet-like materials through which a permeate may flow. In various embodiments of the present invention, the permeate carrier layer is configured such that during operation permeate flows in a spiral path along the permeate carrier layer to a permeate exhaust conduit. In one embodiment, the permeate carrier layer is comprised of a perforated plastic sheet. In another embodiment, the permeate carrier layer is comprised of a perforated metal sheet. In yet another embodiment, the permeate carrier layer comprises a porous composite. In yet another embodiment, the permeate carrier layer is a plastic fabric. In yet another embodiment, the permeate carrier layer is a plastic screen. In embodiments of the present invention comprising a plurality of permeate carrier layers, the permeate carrier layers of the separator assembly may be made of the same or different materials. For example, one permeate carrier layer may be a plastic fabric while the other permeate carrier layer is a natural material such as wool fabric. In addition a single permeate carrier layer may comprise different materials at different locations along the permeate flow path through the permeate carrier layer. In one embodiment, for example, the present invention provides a separator assembly comprising a permeate carrier layer a portion of which is a polyethylene fabric and another portion of which is polypropylene fabric.

As noted, in various embodiments, the separator assemblies provided by the present invention comprise at least one membrane layer. Membranes and materials suitable for use as membrane layers are well-known in the art. U.S. Pat. No. 4,277,344, for example, discloses a semipermeable membrane prepared from the reaction of an aromatic polyamine with a polyacyl halide which has been found to be effective in reverse osmosis systems directed at rejecting sodium, magnesium and calcium cations, and chlorine, sulfate and carbonate anions. U.S. Pat. No. 4,277,344, for example, discloses a membrane prepared from the reaction of an aromatic polyacyl halide with a bifunctional aromatic amine to afford a polymeric material which has been found useful in the preparation of membrane layers effective in reverse osmosis systems directed at rejecting certain salts, such as nitrates. A host of technical references describing the preparation of various membranes and materials suitable for use as the membrane layer in various embodiments of the present invention are known to those of ordinary skill in the art. In addition, membranes suitable for use as the membrane layer in various embodiments of the present invention are well known and widely available articles of commerce.

In one embodiment, the membrane layer comprises a functionalized surface and an unfunctionalized surface. In one embodiment, the functionalized surface of the membrane layer represents an active surface of the membrane and the unfunctionalized surface of the membrane layer represents a passive surface of the membrane. In an alternate embodiment, the functionalized surface of the membrane layer represents a passive surface of the membrane and the unfunctionalized surface of the membrane layer represents an active surface of the membrane. In various embodiments of the present invention, the active surface of the membrane layer is typically in contact with the feed carrier layer and serves to prevent or retard the transmission of one or more solutes present in the feed solution across the membrane to the permeate carrier layer.

As used herein the phrase "not in contact" means not in "direct contact" (i.e. the referenced elements do not touch one another), but also may include the further limitation that the referenced elements be separated by an intervening membrane layer. For example, two layers of the membrane stack assembly, or the multilayer membrane assembly, are "not in contact" when there is an intervening membrane layer between them despite the fact that the two layers are in fluid communication, since in general a fluid may pass from one layer to the other via the intervening layer. As used herein the phrase "in contact" includes "direct contact" as well as additional configurations. For example, adjacent layers in the membrane stack assembly, or the multilayer membrane assembly, are said to be "in contact" because they touch one another. In addition, layers "in contact" with one another include configurations in which two permeate carrier layers in a membrane stack assembly are separated by an intervening third permeate carrier layer. Similarly, two feed carrier layers separated by an intervening third feed carrier layer are said to be in contact with one another. Similarly a layer touching the surface of an exhaust conduit, as for example when a layer is wound around the exhaust conduit, is said to be "in contact" with the exhaust conduit provided that fluid may pass from the layer into the exhaust conduit. As a further illustration, the permeate carrier layer is said to be in contact with the permeate exhaust conduit when the permeate carrier layer is in direct contact with the permeate exhaust conduit, as for example when the permeate carrier layer is wound around the permeate exhaust conduit with no intervening layers between the surface of the permeate exhaust conduit and the permeate carrier layer. Similarly, the feed carrier layer is said to be not in contact with the permeate exhaust conduit, as when, for example, the feed carrier layer is separated from the porous exhaust conduit by an intervening membrane layer which itself is separated from the porous exhaust conduit by an intervening permeate carrier layer in direct contact with the surface of the porous exhaust conduit. In general, the feed carrier layer has no point of contact with the permeate exhaust conduit and fluid from the feed carrier layer may not enter the permeate exhaust conduit without first passing through an intervening membrane layer. Similarly, the permeate carrier layer has no point of contact with the concentrate exhaust conduit and fluid from the permeate carrier layer may not enter the concentrate exhaust conduit without first passing through an intervening membrane layer.

In one embodiment, the multilayer membrane assembly is radially disposed around the central core element. As used herein the phrase "radially disposed" means that a second portion of the membrane stack assembly comprising at least one feed carrier layer, at least one membrane layer, and at least one permeate carrier layers is wound around a central core element comprising at least one concentrate exhaust conduit and at least one permeate exhaust conduit in a manner that limits the creation of folds or creases in the membrane layers. In general, the greater the extent to which a membrane layer is deformed by folding or creasing, the greater the likelihood of damage to the active surface of the membrane, loss of membrane function, and membrane integrity. Conventional separator assemblies typically comprise a highly folded multilayer membrane assembly comprising multiple folds in the membrane layer. Assuming the unfolded membrane layer represents a 180 degree straight angle, a highly folded membrane layer can be described as having a fold characterized by a reflex angle of greater than about 340 degrees. In one embodiment, the separator assembly provided by the present invention contains no membrane layer folds characterized by a reflex angle greater than 340 degrees. In an alternate embodiment, the separator assembly provided by the present invention contains no membrane layer folds characterized by a reflex angle greater than 300 degrees. In yet another embodiment, the separator assembly provided by the present invention contains no membrane layer folds characterized by a reflex angle greater than 270 degrees.

In one embodiment, the separator assembly provided by the present invention may be used as a salt separator assembly for separating salt from water. The feed solution may be, for example, seawater or brackish water. Typically the separator assembly is contained within a pressurizable housing which permits initial contact between the feed solution and the feed carrier layer only at an outer surface of the separator assembly. This is typically accomplished by sealing the ends of the separator assembly prior to its insertion within the pressurizable housing. For example a fully wound structure, as shown in, for example FIG. 3, may be prepared and the exposed portions of the central core element may be masked. The ends of the fully wound structure are then dipped into a sealant, for example hot glue, which is then cured. The result is a separator assembly in which the end surfaces are sealed with a barrier which does not transmit feed solution, permeate, or concentrate during operation. To illustrate this concept the separator assembly can be thought of as a cylinder having a first surface and a second surface each having a surface area of $\pi r^2$, wherein "r" is the radius of the cylinder defined by the separator assembly, and a third surface having a surface area of $2\pi rh$ wherein "h" is the length of the cylinder. When the "ends" of the separator assembly 300 are sealed, each of the first surface and the second surface has been sealed to prevent contact of the feed solution with the feed carrier layer at any surface other than the third surface (also referred to at times herein as the "outer surface" and the "feed surface") having surface area $2\pi rh$. In other embodiments, the separator assembly can by various means be made to fit snugly into a pressurizable housing such that a feed solution entering the pressurizable housing encounters only the third surface (the "feed surface") of the separator assembly and feed solution does not contact the first or second surfaces of the separator assembly, and neither permeate nor concentrate may exit the housing without passing through the separator assembly. In one embodiment, the feed solution enters the separator assembly at points on the third surface of the separator assembly where the feed carrier layer is in contact with the feed solution. As shown in FIG. 5C the edges of the membrane stack assembly may be sealed to prevent contact and transmission of the feed solution from the first surface of separator assembly by the permeate carrier layer. Thus, the feed solution enters the separator assembly at a "feed surface" (e.g. the third surface) of the separator assembly and travels along a spiral path through the feed carrier layer of the separator assembly during which passage, the feed solution is modified by its contact with the membrane layer through which a portion of the feed solution ("permeate" or "the permeate") passes and contacts the permeate carrier layer. The passage of the feed solution through the separator assembly is at times herein referred to as "spiral flow" through the separator assembly until it emerges as "concentrate" (also referred to at times as "brine") at one or more concentrate exhaust conduits present in the separator assembly. One of ordinary skill in the art will appreciate that as a feed solution, for example seawater, travels from an initial point of contact between the feed solution and the feed carrier layer on the outer surface ("third surface") of the separator assembly toward the concentrate exhaust conduit, the concentration of salt present in the fluid in the feed carrier layer is increased through the action of the salt-rejecting membrane layer in contact with the feed solution passing through the feed carrier layer, and that the concentrate reaching the concentrate exhaust conduit will be characterized by a higher concentration of salt than the seawater used as the feed solution.

The roles and function of the permeate exhaust conduit and permeate carrier layer may be illustrated using the salt separator assembly example above. Thus, in one embodiment, the separator assembly may be used as a salt separator assembly for separating salt from water. The feed solution, for example sea water, is contacted with the outer surface (the third surface) of the separator assembly comprised of a portion of the feed carrier layer remote from the concentrate exhaust conduit. The permeate carrier layer does not form an outer surface of the separator assembly and is not in direct contact with the feed solution. Under such circumstances, the permeate carrier layer is said not to form an outer surface of the separator assembly. As the feed solution passes along the feed carrier layer it contacts the salt-rejecting membrane layer which modifies and transmits a fluid comprising one or more components of the feed solution to the permeate carrier layer. This fluid transmitted by the salt-rejecting membrane layer, called permeate (or "the permeate"), passes along the permeate carrier layer until it reaches that portion of the permeate carrier layer in contact with the exterior of the permeate exhaust conduit, where the permeate is transmitted from the permeate carrier layer into the interior of the permeate exhaust conduit. Flow of permeate through the permeate carrier layer is referred to as "spiral flow" since the permeate tends to follow a spiral path defined by the permeate carrier layer toward the permeate exhaust conduit. One of ordinary skill in the art will appreciate that as a feed solution, is modified and transmitted by the salt-rejecting membrane layer into the permeate carrier layer, the concentration of salt in the permeate is reduced relative to the feed solution due to the salt-rejecting action of the membrane layer.

In one embodiment, the separator assembly provided by the present invention comprises a plurality of concentrate exhaust conduits. In one embodiment, the number of concentrate exhaust conduits is in a range of from 1 conduit to 8 conduits. In another embodiment, the number of concentrate exhaust conduits is in a range of from 2 conduits to 6 conduits. In still another embodiment, the number of concentrate exhaust conduits is in a range of from 3 conduits to 4 conduits.

In one embodiment, the separator assembly comprises a plurality of permeate exhaust conduits. In an alternate embodiment, the number of permeate exhaust conduits is in a range of from 1 conduit to 8 conduits. In another embodiment, the number of permeate exhaust conduits is in a range of from 2 conduits to 6 conduits. In still another embodiment, the number of permeate exhaust conduits is in a range of from 3 conduits to 4 conduits.

In one embodiment, the separator assembly provided by the present invention comprises a single feed carrier layer. In an alternate embodiment, the separator assembly provided by the present invention comprises a plurality of feed carrier layers. In one embodiment, the number of feed carrier layers is in a range of from one layer to six layers. In another embodiment, the number of feed carrier layers is in a range of from two layers to five layers. In still another embodiment, the number of feed carrier layers is in a range of from three layers to four layers.

In one embodiment, the separator assembly provided by the present invention comprises a single permeate carrier layer. In an alternate embodiment, the separator assembly comprises a plurality of permeate carrier layers. In one embodiment, the number of permeate carrier layers is in a range of from 1 layer to 6 layers. In another embodiment, the number of permeate carrier layers is in a range of from 2 layers to 5 layers. In still another embodiment, the number of permeate carrier layers is in a range of from 3 layers to 4 layers.

In one embodiment, the separator assembly provided by the present invention comprises a single membrane layer. In an alternate embodiment, the separator assembly comprises a plurality of membrane layers. In one embodiment, the separator assembly provided by the present invention comprises at least two membrane layers. In an alternate embodiment, the number of membrane layers is in a range of from 1 layer to 6 layers. In another embodiment, the number of membrane layers is in a range of from 2 layers to 5 layers. In still another embodiment, the number of membrane layers is in a range of from 3 layers to 4 layers. In one embodiment, the number of membrane layers is directly proportional to the active surface area required to be provided by the separator assembly.

Referring to FIG. 1, the figure represents the components of and method of making a conventional separator assembly. A conventional membrane stack assembly 120 comprises a folded membrane layer 112 wherein a feed carrier layer 116 is sandwiched between the two halves of the folded membrane layer 112. The folded membrane layer 112 is disposed such that an active side (not shown in figure) of the folded membrane layer is in contact with the feed carrier layer 116. An active side of the membrane layer 112 is at times herein referred to as "the active surface" of the membrane layer. The folded membrane layer 112 is enveloped by permeate carrier layers 110 such that the passive side (not shown in figure) of the membrane layer 112 is in contact with the permeate carrier layers 110. A passive side of the membrane layer 112 is at times herein referred to as "the passive surface" of the membrane layer. Typically, an adhesive sealant (not shown) is used to isolate the feed carrier layer from the permeate carrier layer and prevent direct contact between a feed solution (not shown) and the permeate carrier layer. A plurality of membrane stack assemblies 120 wherein each of the permeate layers 110 is connected to a common permeate carrier layer 111 in contact with the permeate exhaust conduit 118 is wound around the permeate exhaust conduit 118, for example by rotating the permeate exhaust conduit 118 in direction 122, and the resultant wound structure is appropriately sealed to provide a conventional separator assembly. The permeate exhaust conduit comprises openings 113 to permit fluid communication between the permeate exhaust conduit channel 119 and the common permeate carrier layer 111. As the membrane stack assemblies are wound around the permeate exhaust conduit 118, the reflex angle defined by the folded membrane layer 112 approaches 360 degrees.

Referring to FIG. 2A, the figure represents cross-section view at midpoint 200 of a first portion 231 of a membrane stack assembly 120 disposed within a cavity defined by a central core element comprising two porous exhaust conduits, one of which is a permeate exhaust 118 and one of which is a concentrate exhaust conduit 218. A second portion 232 of the membrane stack assembly 120 is disposed outside of the central core element. As noted, the first portion 231 of membrane stack assembly is disposed within a cavity defined by the porous exhaust conduits 118 (permeate) and 218 (concentrate) of the central core element. The membrane stack assembly 120 illustrated in FIG. 2A, FIG. 2B and FIG. 2C comprises a single permeate carrier layer 110, a single feed carrier layer 116 and a single membrane layer permeate carrier 112. Rotation of the central core element comprising porous exhaust conduits 118 and 218 in direction 222 affords the partially wound structure 240 shown in FIG. 2B. Partially wound structure 240 is obtained by rotating the central core element of the assembly shown in FIG. 2A through a 180 degree rotation in direction 222. That portion (the second portion 232) of the membrane stack assembly 120 which is wound around the central core element becomes the multilayer membrane assembly of the completed separator assembly. FIG. 2C shows the wound structure 250 obtained after the permeate carrier layer 110 and membrane layer 112 have been completely wound around the central core element and sufficient feed carrier layer 116 remains to prepare the separator assembly 300 shown in FIG. 3. The separator assembly 300 (FIG. 3) is obtained by completely winding the second portion of the membrane stack assembly around the central core element and securing the ends of the membrane stack assembly. In addition, the ends of the wound structure are sealed to prevent edge-on contact of the feed solution with the separator assembly.

Figure 3:
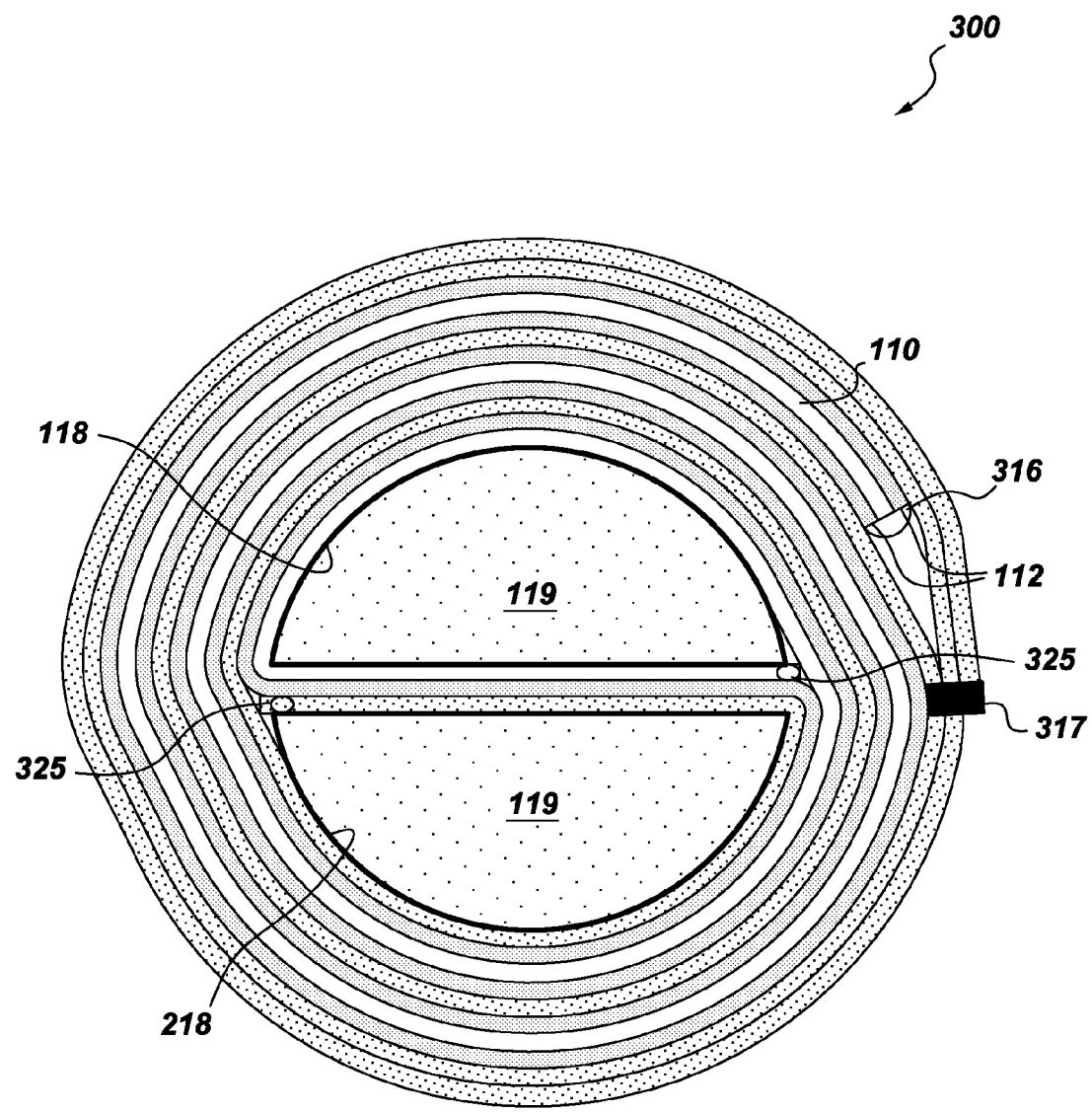
FIG. 3 illustrates a separator assembly in accordance with one or more embodiments of the present invention.

Referring to FIG. 3, the figure represents a cross-section view at midpoint of a separator assembly 300 comprising a central core element in accordance with an embodiment of the invention. Separator assembly 300 comprises a central core element comprising a permeate exhaust conduit 118 and a concentrate exhaust conduit 218, each exhaust conduit defining an interior channel 119 also at times herein referred to as exhaust channel 119. The central core element shown in FIG. 3 is shown as defining a cavity which accommodates a first portion of the membrane stack assembly. The membrane stack assembly comprises one feed carrier layer 116, a permeate carrier layer 110, and a membrane layer 112, the membrane layer 112 being disposed between the feed carrier layer 116 and the permeate carrier layer 110. In the view shown, the exhaust conduits 118 and 218 of the central core element define and are separated by a cavity configured to accommodate a first portion 231 (FIG. 2A) of the membrane stack assembly 120. A second portion 232 (FIG. 2A) of the membrane stack assembly forms a multilayer membrane assembly disposed around the central core element. FIG. 3 shows clearly that the feed carrier layer 116 is not in contact with the permeate exhaust conduit 118 or the permeate carrier layer 110, and that the permeate carrier layer 110 is not in contact with the concentrate exhaust conduit 218 or the feed carrier layer 116. The ends of membrane stack assembly 120 are secured with sealing portion 316. Sealing portion 316 is a transverse line of sealant (typically a curable glue) which seals the outermost permeate carrier layer to the two adjacent membrane layers 112, said transverse line running the length of the separator assembly 300 in contact with the multilayer membrane assembly. Typically the sealant is applied to the passive surface of the membrane layer 112 which when contacted with the adjacent permeate carrier layer the sealant penetrates and seals the edge of permeate carrier layer. The sealant does not typically penetrate through the active surface of the membrane layer and thus does not come into contact with either the active surface (not shown) of the membrane layer 112 or the feed carrier layer 116. The "third surface" of the separator assembly 300 illustrated in FIG. 3 is comprised exclusively of the feed carrier layer 116 which envelops the underlying wound structure. Also featured in the separator assembly 300 illustrated in FIG. 3 are adhesive lines 325 which secure the innermost ends of the permeate carrier layer 110 and the feed carrier layer 116 to the permeate exhaust conduit 118 and concentrate exhaust conduit 218 respectively. A variety of adhesive sealants, such as glues and/or double-sided tapes may be used to secure the ends of the multilayer membrane assembly to one another (sealing portion 316), the permeate carrier layer and feed carrier layer to the permeate exhaust conduit and concentrate exhaust conduit (transverse sealant line 325), and the end feed carrier layer to itself (sealing portion 317) at the outer surface of the separator assembly. (See also FIG. 5C, in which edge sealant 526 applied to the passive surface of the membrane layer seals the separator assembly at the permeate carrier layer-membrane layer interfaces). Any gaps present within a separator assembly may be eliminated by filling the gap with gap sealant. Gap sealants include curable sealants, adhesive sealants, and the like.

Figure 4A:
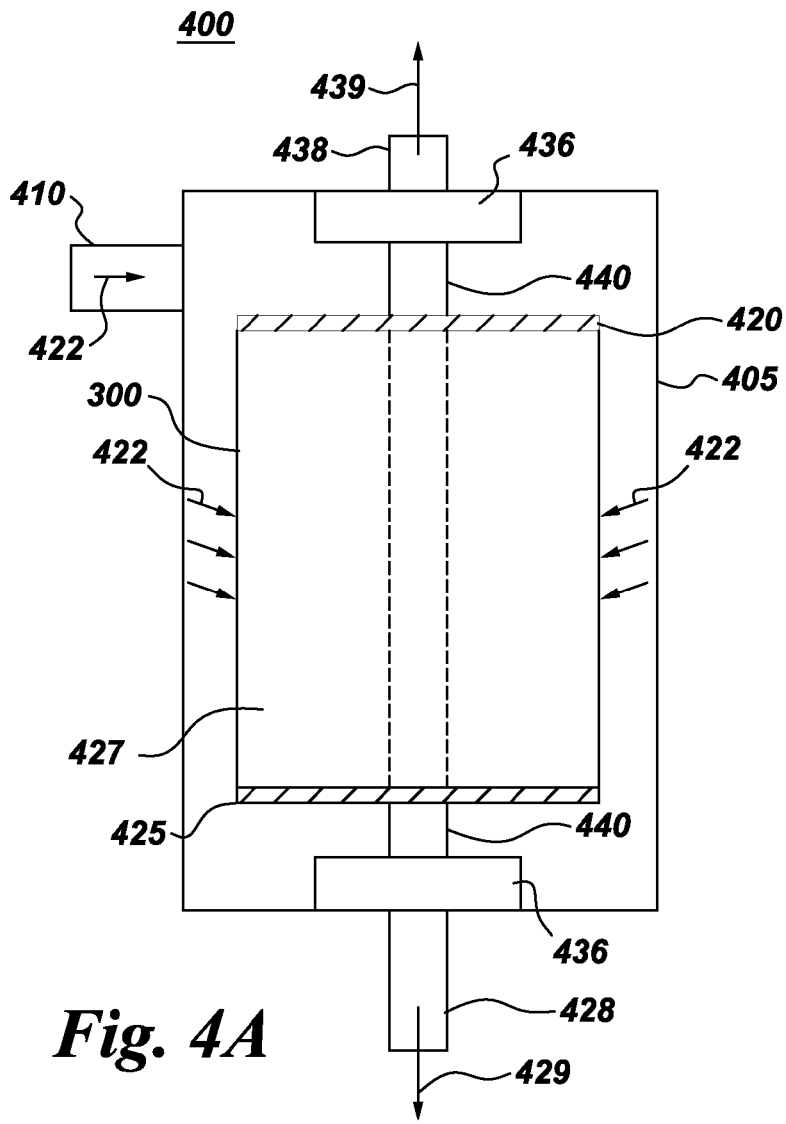
FIG. 4A and FIG. 4B illustrate a spiral flow reverse osmosis apparatus and components thereof in accordance with one or more embodiments of the present invention.
Figure 4B:
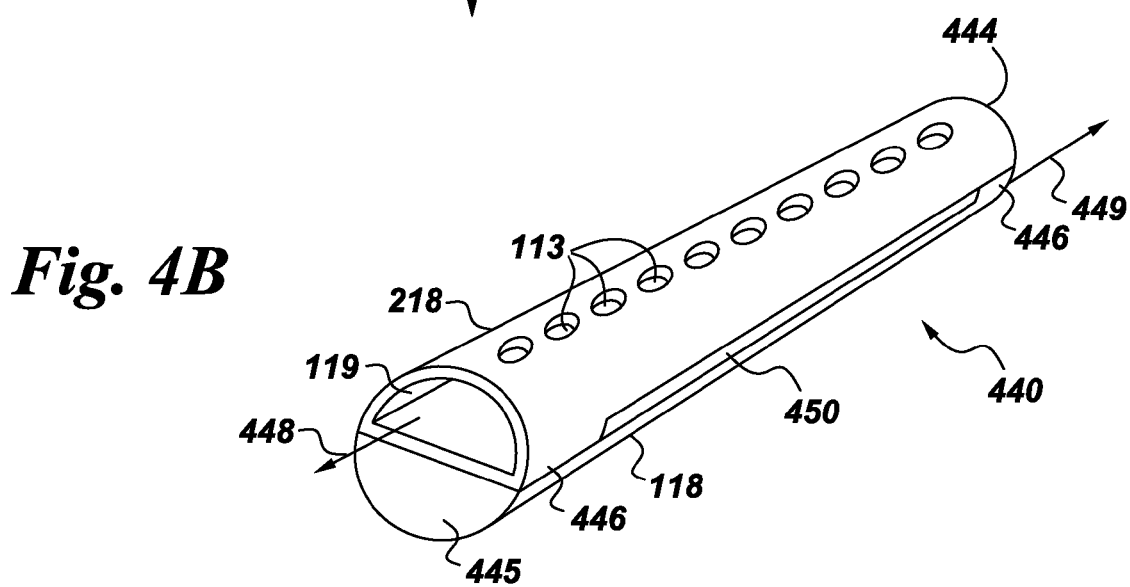

Referring to FIG. 4A, the figure represents a side-on view of a spiral flow reverse osmosis apparatus 400 comprising the separator assembly 300 illustrated in FIG. 3 and comprising a central core element 440 in accordance with an embodiment of the invention. The spiral flow reverse osmosis apparatus 400 comprises a separator assembly 300 secured by coupling members 436 within a pressurizable housing 405. The pressurizable housing 405 comprises a feed inlet 410 configured to provide a feed solution to the outer surface 427 of the separator assembly 300. The pressurizable housing 405 further comprises a permeate exhaust outlet 438 coupled to the permeate exhaust conduit 118 (not shown) of the separator assembly 300, and a concentrate exhaust outlet 428 coupled to the concentrate exhaust conduit 218 (not shown) of separator assembly 300. The ends of central core element 440 are inserted into coupling members 436 to connect the permeate exhaust conduit 118 and the concentrate exhaust conduit 218 to the permeate exhaust outlet 438 and concentrate exhaust outlet 428 respectively. Directional arrows 422 indicate the direction of contact of a feed solution (not shown) with the outer surface 427 of the separator assembly. Direction arrows 429 and 439 indicate the direction of flow of concentrate and permeate respectively through the concentrate exhaust outlet 428 and permeate exhaust outlet 438. FIG. 4A further illustrates the sealed first surface 420 and sealed second surface 425 which prevent the introduction of feed solution (not shown) into the separator assembly through surfaces other than outer surface 427. FIG. 4B illustrates the central core element 440 present in the separator assembly 300 depicted in FIG. 4A. The central core element 440 comprises a permeate exhaust conduit 118 and a concentrate exhaust conduit 218 each of which is blocked at end 445 and 444 respectively. Permeate exiting the permeate exhaust conduit 118 flows in direction 449 (FIG. 4B) while concentrate exiting the concentrate exhaust conduit 218 flows in direction 448. Within the permeate exhaust conduit and concentrate exhaust conduit shown in FIG. 4B, flow is said to be unidirectional. In the embodiment shown in FIG. 4B the central core element 440 is comprised of a separable pair of porous exhaust conduits 118 (a permeate exhaust conduit) and 218 (a concentrate exhaust conduit) which are half cylinders modified by spacer elements 446. In the embodiment shown, each porous exhaust conduit comprises a spacer element 446 which is integral to the porous exhaust conduit, and the porous exhaust conduit comprising the spacer element is a single piece, for example a single molded plastic part. In the embodiment illustrated in FIG. 4B, the permeate exhaust conduit 118 is identical in geometry to concentrate exhaust conduit 218. Permeate exhaust conduit 118 comprises spacer element 446 and openings 113 (not shown) communicating with channel 119 (not shown) through which, during operation, permeate flows. Permeate exhaust conduit 118 is closed at end 445. Concentrate exhaust conduit 218 comprises spacer element 446 and openings 113 communicating with channel 119 through which, during operation, concentrate flows. Concentrate exhaust conduit 218 is blocked at end 444. Spacer elements 446 of central core element 440 define a cavity 450 which is configured to accommodate a first portion of the membrane stack assembly 120, as shown, for example in FIG. 2A. Because spacer elements 446 are integral to and form part of porous exhaust conduits 118 and 218, cavity 450 may logically be said to be defined by porous exhaust conduits 118 and 218.

Figure 5A:
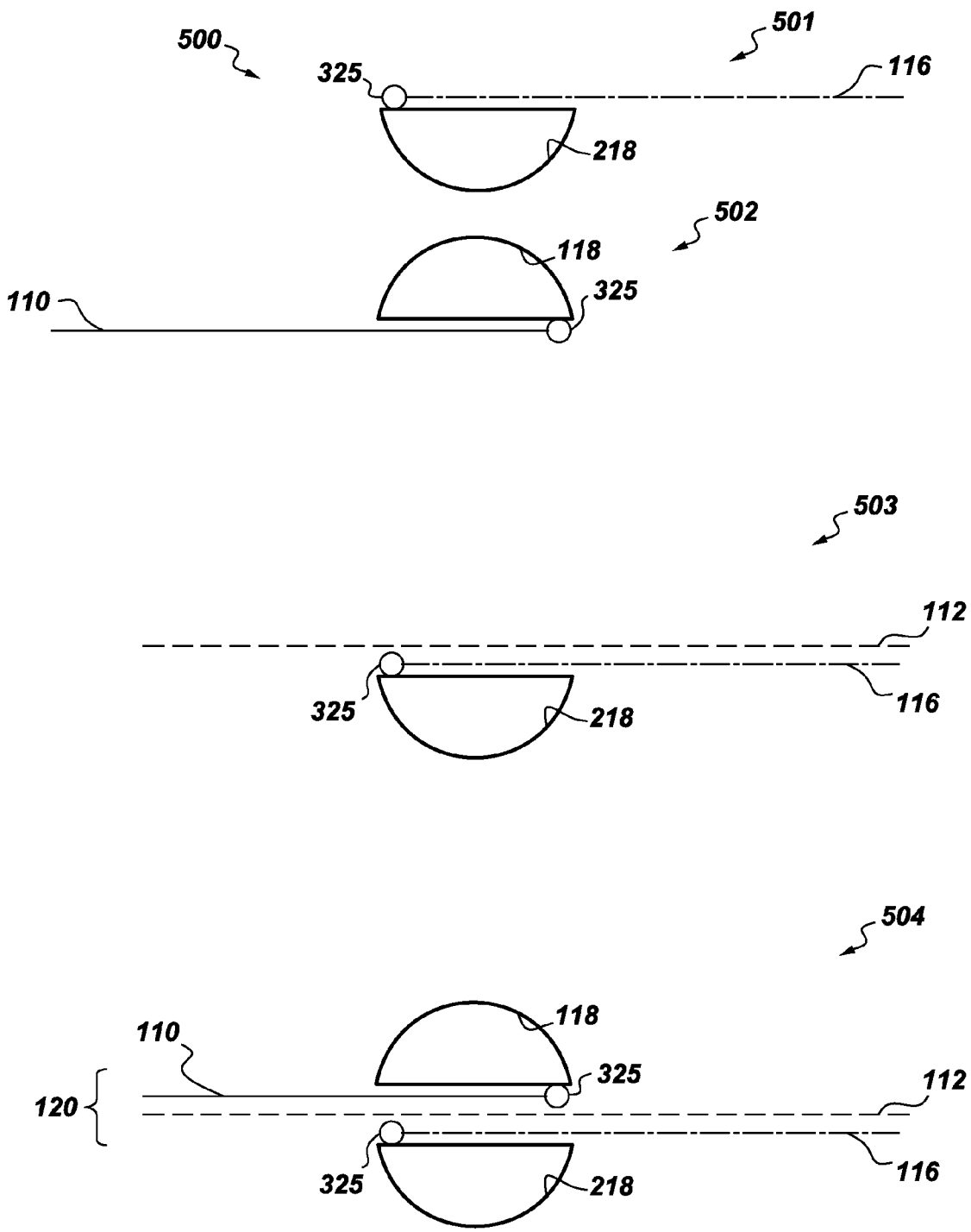
Figure 5C:
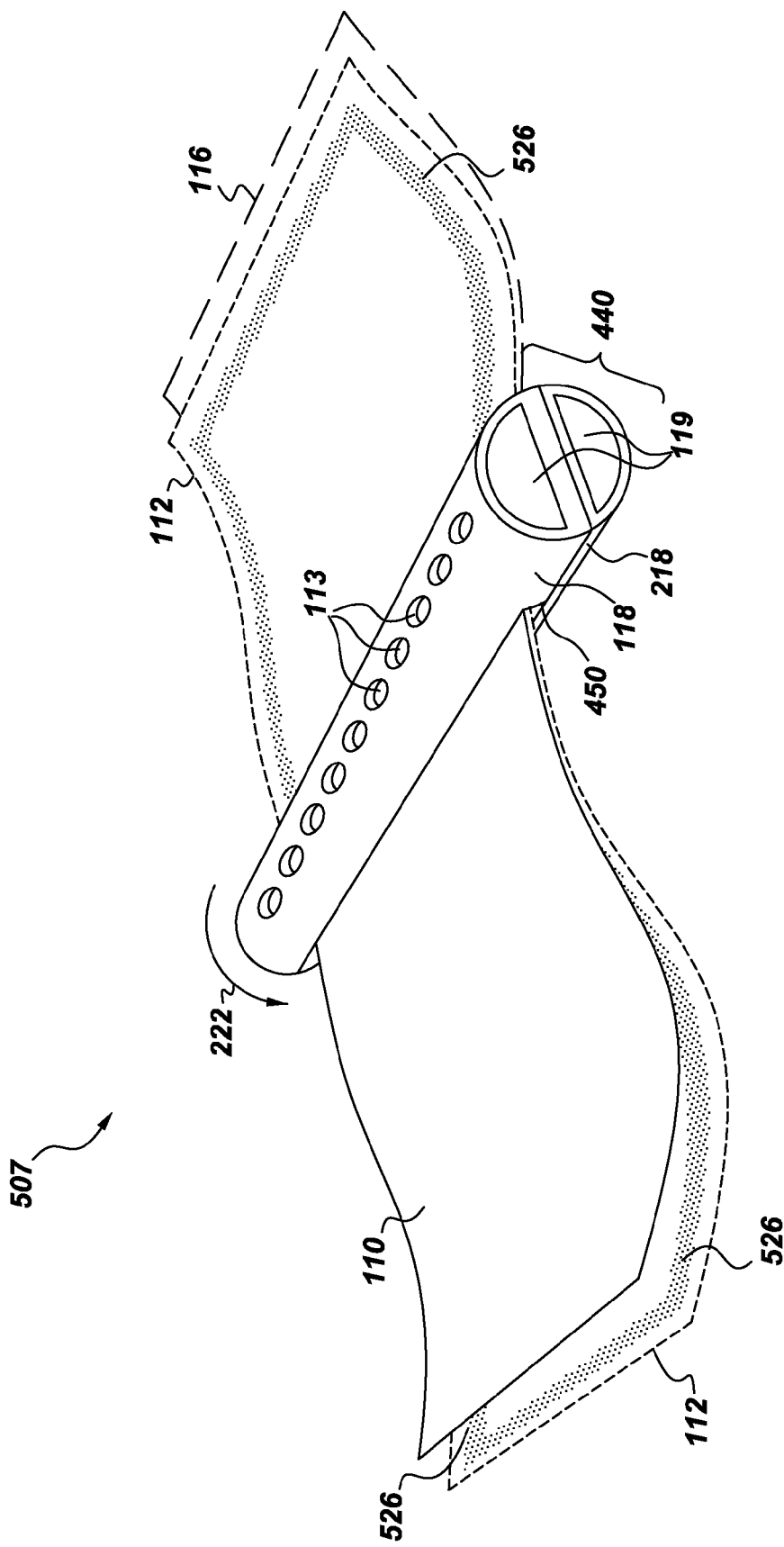

Referring to FIG. 5A, the figure represents a method 500 in accordance with an embodiment of the present invention for making the separator assembly 300 shown in FIG. 3. In a first method step 501 a first intermediate assembly is formed by providing a concentrate exhaust conduit 218 and applying a bead of glue (not shown) along a line 325 running a length of the concentrate exhaust conduit and thereafter placing the feed carrier layer 116 in contact with the uncured glue along line 325 and curing to provide the first intermediate assembly shown.

The portion of the concentrate exhaust conduit referred to as "a length of the concentrate exhaust conduit" corresponds to the width of the feed carrier layer and to that portion of the concentrate exhaust conduit adapted for contact with the feed carrier layer. As is apparent from this example and other parts of this disclosure, the length of the concentrate exhaust conduit is typically greater than the length of that portion of the concentrate exhaust conduit adapted for contact with the feed carrier layer. And typically, the concentrate exhaust conduit is longer than the width of the multilayer membrane assembly disposed around it in the separator assembly provided by the present invention. That portion of the concentrate exhaust conduit adapted for contact with the feed carrier layer is porous, for example by being provided with openings, for example those shown as elements 113 in FIG. 4B. That portion of the concentrate exhaust conduit not adapted for contact with the feed carrier layer may not be porous except with respect to flow control baffles and openings such as elements 714 and 1001 featured in FIG. 13. In certain embodiments of the present invention that portion of the concentrate exhaust conduit not adapted for contact with the feed carrier layer carrier layer is not porous.

In a second method step 502 a second intermediate assembly is formed by providing a permeate exhaust conduit 118 and applying a bead of glue (not shown) along a line 325 running a length of the permeate exhaust conduit and thereafter placing the permeate carrier layer 110 in contact with the uncured glue along line 325 and curing to provide the second intermediate assembly shown.

The portion of the permeate exhaust conduit referred to as "a length of the permeate exhaust conduit" corresponds to the width of the permeate carrier layer and to that portion of the permeate exhaust conduit adapted for contact with the permeate carrier layer. As is apparent from this example and other parts of this disclosure, the length of the permeate exhaust conduit is typically greater than the length of that portion of the permeate exhaust conduit adapted for contact with the permeate carrier layer. And typically, the permeate exhaust conduit is longer than the width of the multilayer membrane assembly disposed around it in the separator assembly provided by the present invention. That portion of the permeate exhaust conduit adapted for contact with the permeate carrier layer is porous, for example by being provided with openings, for example those shown as elements 113 in FIG. 4B. That portion of the permeate exhaust conduit not adapted for contact with the permeate carrier layer may not be porous except with respect to flow control baffles and openings such as elements 714 and 1001 featured in FIG. 13. In certain embodiments of the present invention that portion of the permeate exhaust conduit not adapted for contact with the permeate carrier layer is not porous.

In a third method step 503, a third intermediate assembly is prepared. A membrane layer 112 having an active surface (not shown) and a passive surface (not shown) is placed in contact with the first intermediate assembly of method step 501 such that the active surface (not shown) of the membrane layer 112 is in contact with the feed carrier layer 116. The membrane layer 112 is positioned such that it is bisected by, but not in contact with, concentrate exhaust conduit 218.

In a fourth method step 504, a fourth intermediate assembly is formed. A second intermediate assembly as depicted in method step 502 is joined to the third intermediate assembly depicted in method step 503. The fourth intermediate assembly depicted in method step 504 features a membrane stack assembly 120 comprising a membrane layer 112 disposed between a feed carrier layer 116 and a permeate carrier layer 110. The fourth intermediate assembly shown in method step 504 shows a first portion of membrane stack assembly 120 disposed within a cavity defined by central core element comprising a permeate exhaust conduit 118 and a concentrate exhaust conduit 218, and a second portion of membrane stack assembly 120 disposed outside of the central core element.

In a fifth method step 505 (FIG. 5B) an edge sealant 526 is applied as a longitudinal line along each edge of the passive surface of the membrane layer 112 to afford a fifth intermediate assembly. The edge sealant permeates the adjacent permeate carrier layer along the entire length of its edge. Those skilled in the art will appreciate that the fifth intermediate assembly represented in method step 505 does not represent a cross-section at midpoint view but is, rather, a view from the incipient first or second surface of the separator assembly, the first and second surfaces of the separator assembly representing the "ends" of an idealized cylindrical separator assembly, the "ends" of the idealized cylindrical separator assembly having surface areas equal to $\pi r^2$, wherein "r" is the radius of the cylinder defined by the separator assembly, this in contrast to a third surface of the idealized cylindrical separator assembly having a surface area of $2\pi rh$ wherein "h" is the length of the cylinder defined by the idealized cylindrical separator assembly.

In a sixth method step 506 the free portions of the fifth intermediate assembly (also referred to as the "second portion" of the membrane stack assembly) are wound around the central core element before curing of the edge sealant 526. Winding the second portion of the membrane stack assembly around the central core element is carried out while the edge sealant is in an uncured state to allow the surfaces of layers of the membrane stack assembly some freedom of motion during the winding process. In one embodiment, the edge sealant 526 is applied as part of the winding step. The structure shown in method step 506 (a sixth intermediate assembly) depicts the structure shown in method step 505 after rotating the central core element through about 180 degrees. The preparation of separator assembly 300 may be completed by rotating the central core element in direction 222 thereby winding the second portion of the membrane stack assembly around the central core element to form a wound structure, and then securing the ends of the membrane stack assembly. The length of the feed carrier layer is sufficiently long so that it envelops the underlying wound structure and comprises the entire outer surface (third surface) of the separator assembly. The first and second surfaces of the separator assembly may be sealed to prevent edge-on contact of feed solution with the feed carrier layer. The ends of the membrane stack assembly present in the wound structure may be secured by various means such as curable adhesives, curable glues, double sided tapes and the like. The wound second portion of the membrane stack assembly is referred to in this embodiment as the multilayer membrane assembly. This multilayer membrane assembly is said to be disposed around the central core element comprising permeate exhaust conduit 118 and concentrate exhaust conduit 218. Curing of edge sealant 526, effectively seals the edges of the permeate carrier layer 110 and membrane layer 112 at both the first and second surfaces of the separator assembly, and blocks fluid transmission from the feed surface except by means of the feed carrier layer 116.

Referring to FIG. 5C, structure 507 presents a perspective view of a membrane stack assembly 120 disposed within a cavity 450 defined by central core element 440 during the preparation of a separator assembly of the present invention. The structure 507 corresponds to the fifth intermediate assembly shown in method step 505. A curable edge sealant 526 is shown as disposed along each longitudinal and transverse edge (there are a total of six such edges) on the passive surface of membrane layer 112 and in contact with permeate carrier layer 110. The central core element 440 is rotated in direction 222 to provide a wound structure. In the embodiment shown in FIG. 5C, permeate exhaust conduit 118 and concentrate exhaust conduit 218 define a cavity 450 between themselves, the cavity being configured to accommodate a first portion of a membrane stack assembly. Openings 113 in each of the permeate exhaust conduit 118 and concentrate exhaust conduit 218 allow fluid communication between the exterior surface of the permeate exhaust conduit and the exhaust channel 119.

Figure 6:
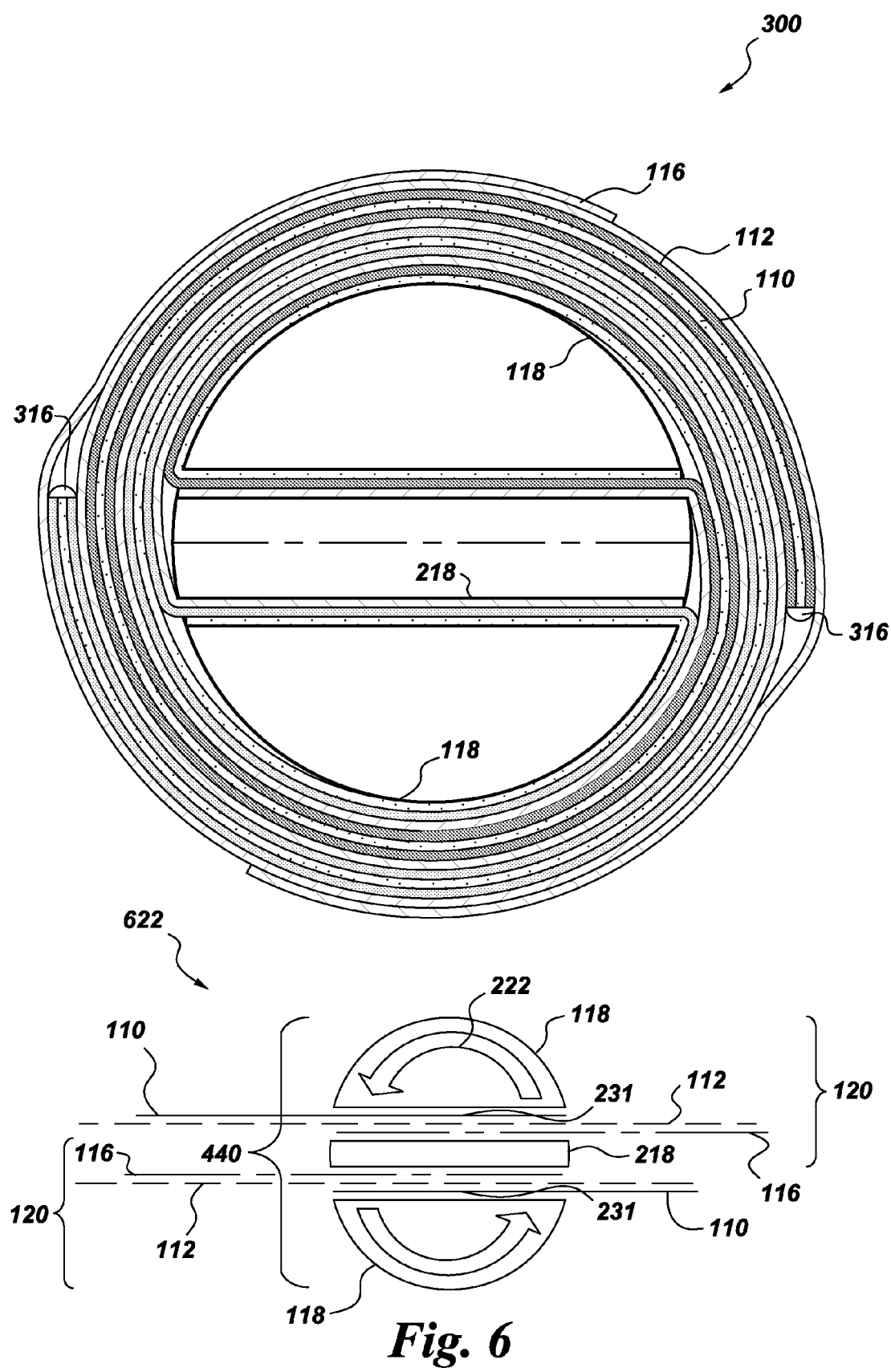
FIG. 6 illustrates a separator assembly in accordance with one or more embodiments of the present invention.

Referring to FIG. 6, the figure represents a cross-section view at midpoint of a separator assembly 300 in accordance with an embodiment of the present invention. The separator assembly 300 comprises two permeate carrier layers 110, two membrane layers 112, and two feed carrier layers 116 radially disposed around a central core element comprising two permeate exhaust conduits 118 and a concentrate exhaust conduit 218. The permeate exhaust conduits 118 and the concentrate exhaust conduit 218 are not in contact with each other. The outer surface of the separator assembly 300 is comprised of the feed carrier layers 116 which completely envelop the underlying wound structure. The ends of the feed carrier layers 116 are secured by additional sealing portions (not shown). Separator assembly 300 may be prepared by providing two membrane stack assemblies 120 disposed as shown in intermediate assembly 622 (FIG. 6) within a pair of cavities defined by central core element 440 comprising two permeate exhaust conduits 118 and one concentrate exhaust conduit 218. The two membrane stack assemblies 120 are then wound about the central core element in direction 222 to provide a multilayer membrane assembly radially disposed around central core element 440. The preparation of the separator assembly 300 is completed by applying sealing portions 316 and securing the ends of feed carrier layers 116, for example by gluing. Sealing portions 316 prevent direct contact of a feed solution with the permeate carrier layer. The first and second surfaces (not shown) of the separator assembly 300 depicted in FIG. 6 may be sealed by, for example, masking the ends of the concentrate exhaust conduit 218 and permeate exhaust conduits 118 and dipping the ends of the wound assembly in epoxy sealant followed by curing. The ends of the permeate exhaust conduit and concentrate exhaust conduit are unmasked to provide the completed separator assembly 300.

Figure 7:
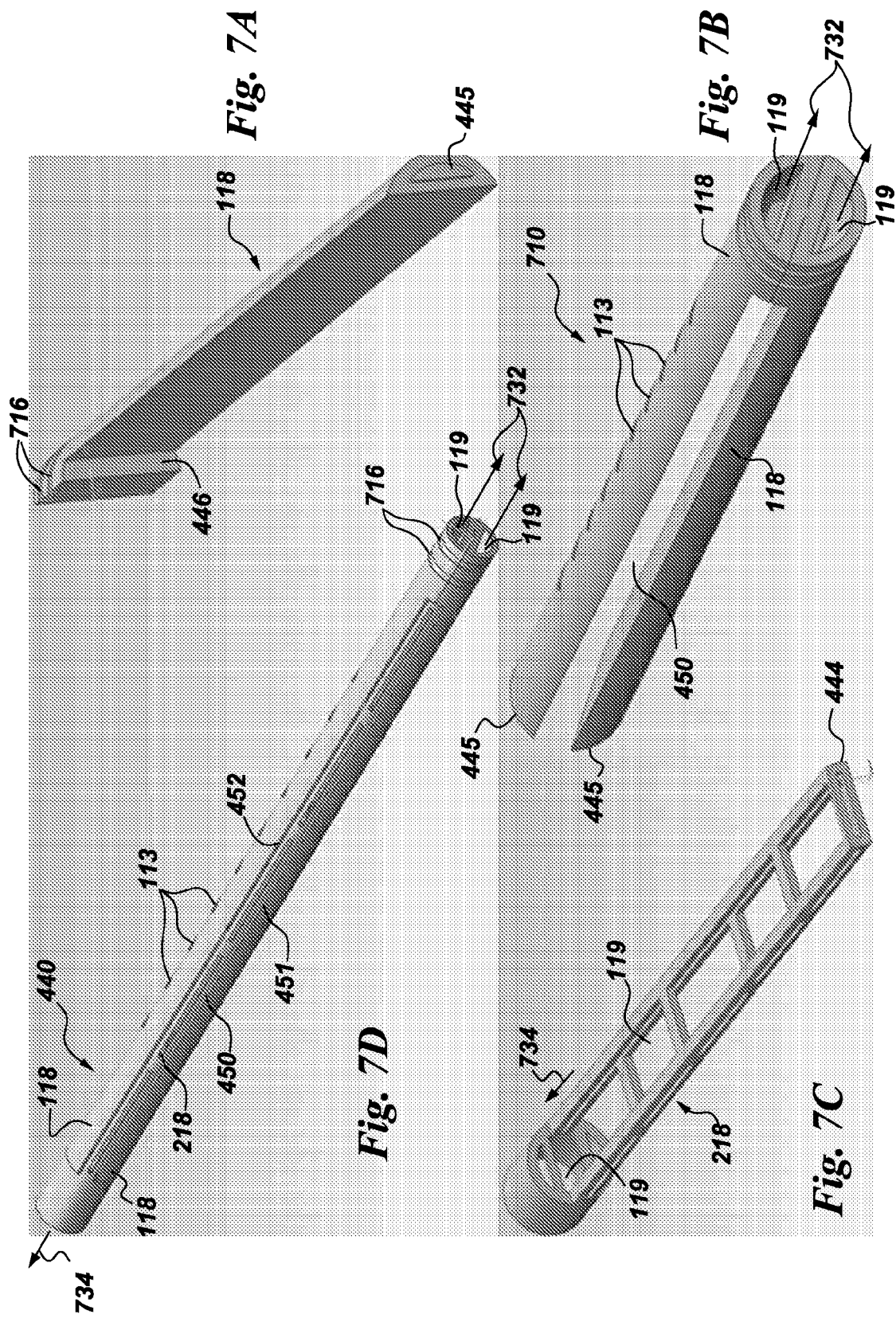
FIG. 7A, FIG. 7B, FIG. 7C and FIG. 7D illustrate a central core element and central core element components which may be used in accordance with one or more embodiments of the present invention.

Referring to FIG. 7, the figure (FIG. 7D) represents a central core element 440 which may be employed in various embodiments of the present invention. Central core element 440 comprises two permeate exhaust conduits 118 and a concentrate exhaust conduit 218. In the example presented by FIG. 7, the central core element 440 may be used to prepare separator assembly 300 shown in FIG. 6 in cross-section view at midpoint. Each of the permeate exhaust conduits 118 present in central core element 440, is shown in FIG. 7A as a modified half cylinder comprising spacer elements 446 and defining a permeate exhaust channel 119 (not visible in FIG. 7A but shown in FIG. 7B), openings 113 (not shown) communicating with permeate exhaust channel 119, and grooves 716 adapted for securing an o-ring. The channel 119 runs the length of permeate exhaust conduit 118 which in this example is open one end and closed at end 445. Two permeate exhaust conduits 118 are joined to form partial structure 710 (FIG. 7B) in which openings 113 are visible. Openings 113 allow permeate to flow from the permeate carrier layer into the permeate exhaust channel 119. Partial structure 710 further defines a cavity 450 which accommodates both the concentrate exhaust conduit 218 and two membrane stack assemblies 120 (configured as shown in FIG. 6 (structure 622)). The concentrate exhaust conduit 218 (FIG. 7C) comprises a concentrate exhaust channel 119 which is closed at end 444. As noted, concentrate exhaust conduit 218 is closed at end 444 and flow through the exhaust channel 119 of the concentrate exhaust conduit is restricted to direction 734 (See FIGS. 7C and 7D). Referring to the cross-section view of separator assembly 300 (FIG. 6), the figure shows permeate exhaust conduits 118 are not in contact with concentrate exhaust conduit 218 and that the feed carrier layer 116 is not in contact with the permeate carrier layer 110 or the permeate exhaust conduits 118, and that the feed carrier layer forms the outer surface of the separator assembly 300. As noted each of the permeate exhaust conduits 118 shown in FIG. 7 is a half cylinder shaped tube modified by spacer element 446 (See also FIG. 4B). Because the spacer elements are integral to and form part of permeate exhaust conduits 118, cavity 450 formed when two permeate exhaust conduits 118 are joined together may logically be said to be defined by permeate exhaust conduits 118. In the embodiment shown in FIG. 7D, the central core element 440 is formed by inserting the concentrate exhaust conduit 218 into cavity 450 thereby producing central core element 440 defining cavities 451 and 452, each the cavities being of appropriate dimensions to accommodate a first portion of a membrane stack assembly. Further, because the central core element is comprised of the permeate exhaust conduits 118 and concentrate exhaust conduit 218 and cavities 451 and 452 result from assembling permeate exhaust conduits 118 and concentrate exhaust conduit 218 as shown in FIG. 7D, central core element 440 may logically be said to define cavities 451 and 452.

Referring to FIG. 8, the figure represents a separator assembly 300 in accordance with an embodiment of the present invention. The separator assembly 300 shown in cross-section view at midpoint, comprises two permeate carrier layers 110, two membrane layers 112, and a single feed carrier layer 116 radially disposed around a central core element 440 comprising two permeate exhaust conduits 118, and two concentrate exhaust conduits 218. Sealing portions 316 prevent direct contact of a feed solution with the permeate carrier layer 110, and sealing portion 317 secures the outer ends of the feed carrier layer 116. The permeate exhaust conduits 118 and the concentrate exhaust conduits 218 are not in contact with each other. Separator assembly 300 may be prepared as shown in 830 (FIG. 8) by disposing a single feed carrier layer 116, two permeate carrier layers 110 and two membrane layers 112 within the cavities defined by central core element 440 (FIG. 8), the central core element 440 comprising two permeate exhaust conduits 118 and two concentrate exhaust conduits 218. As shown in FIG. 8 (830), each of the two permeate carrier layers 110 is configured to be in contact with one of the two permeate exhaust conduits 118, and further, the length of the portion of the permeate carrier layer disposed within the central core element is about one half the diameter of the central core element 440. The membrane layers 112 are disposed within the cavities defined by central core element 440 as shown in 830. The approximately 90 degree bend in membrane layers 112 corresponds to a reflex angle of approximately 270 degrees. The feed carrier layer 116 bisects the central core element 440 and is the only layer among the permeate carrier layer, membrane layer and permeate carrier layer to do so. The layers are wound around the central core element 440 in direction 222 to provide a multilayer membrane assembly radially disposed around the central core element. The preparation of the separator assembly 300 is completed by applying sealing portions 316 and securing with sealing portion 317 the end of feed carrier layer 116, for example by gluing the end of feed carrier layer to itself. The ends of the wound assembly may be sealed to prevent edge-on contact of a feed solution with the first or second surfaces of separator assembly.

Referring to FIG. 9, the figure represents a pressurizable housing 405 used in accordance with an embodiment of the present invention for making a spiral flow reverse osmosis apparatus, for example the spiral flow reverse osmosis apparatus 400 shown in FIG. 4A. Referring to FIG. 9, pressurizable housing 405 comprises a detachable first portion 901 and a detachable second portion 902. The first and second portions 901 and 902 may be joined by means of threads 903 for securing 901 to 902, and threads 904 which are complementary to threads 903. Other means of securing a detachable first portion of the pressurizable housing to a detachable second portion of the pressurizable housing include the use of snap together elements, gluing, taping, clamping and like means. Coupling members 436 secure the separator assembly 300 within the pressurizable housing 405 and define a cavity 936 into which the ends of the central core element 440 are inserted.

Figure 10A:
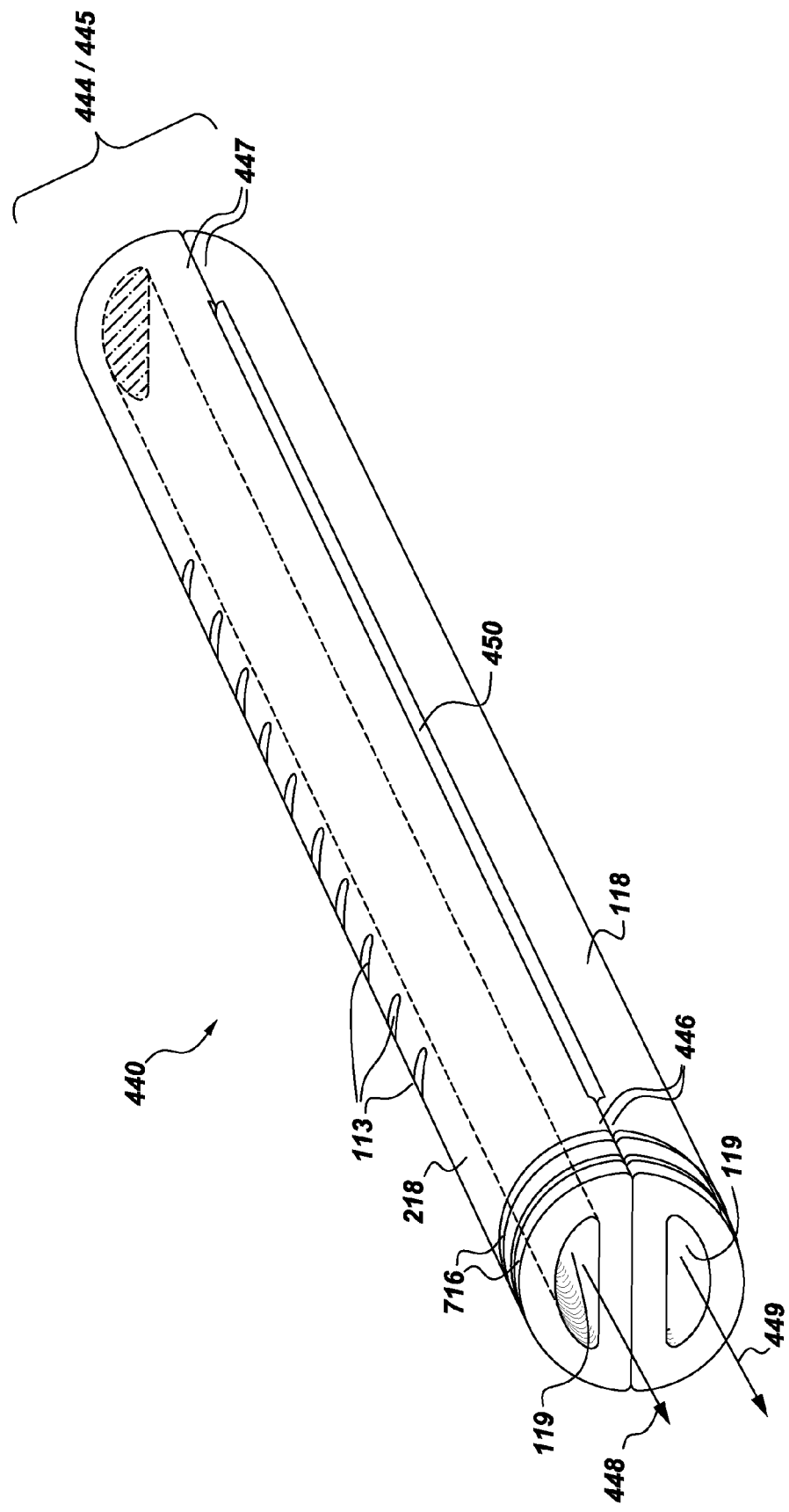

Referring to FIG. 10A, the figure represents a three dimensional, partially cutaway view of a central core element 440 used in accordance with an embodiment of the present invention. The central core element 440 comprises a concentrate exhaust conduit 218 and a permeate exhaust conduit 118 each of which is blocked at ends 444 and 445 respectively. Thus, during operation of a separator assembly comprising central core element 440, flow through concentrate exhaust conduit 218 is unidirectional in direction 448, and flow through permeate exhaust conduit 118 is unidirectional in direction 449.

Each of the permeate and concentrate exhaust conduits defines an exhaust channel 119 and openings 113. In the embodiment shown, at one end, the central core element 440 comprises grooves 716 adapted for securing an o-ring. The component permeate exhaust conduit 118 and concentrate exhaust conduit 218 each comprise a pair of spacer elements 446 and 447 which define cavity 450 which is configured to accommodate the first portion of a membrane stack assembly.

Referring to FIG. 10B, the figure represents a three dimensional solid view of a central core element 440 of the present invention. As in FIG. 10A, the permeate exhaust conduit is blocked at end 445, and the concentrate exhaust conduit is blocked at end 444. Spacer elements 446 and 447 are integral to and are comprised by permeate exhaust conduit 118 and concentrate exhaust conduit 218. When two such porous exhaust conduits are joined as illustrated in FIG. 10A and FIG. 10B, the porous exhaust conduits 118 and 218, define the cavity 450 configured to accommodate a first portion of a membrane stack assembly.

Referring to FIG. 10C, the figure represents an expanded three dimensional solid view of a portion of central core element 440 shown in FIG. 10A and FIG. 10B which may be used in accordance with one or more embodiments of the invention.

Figure 11:
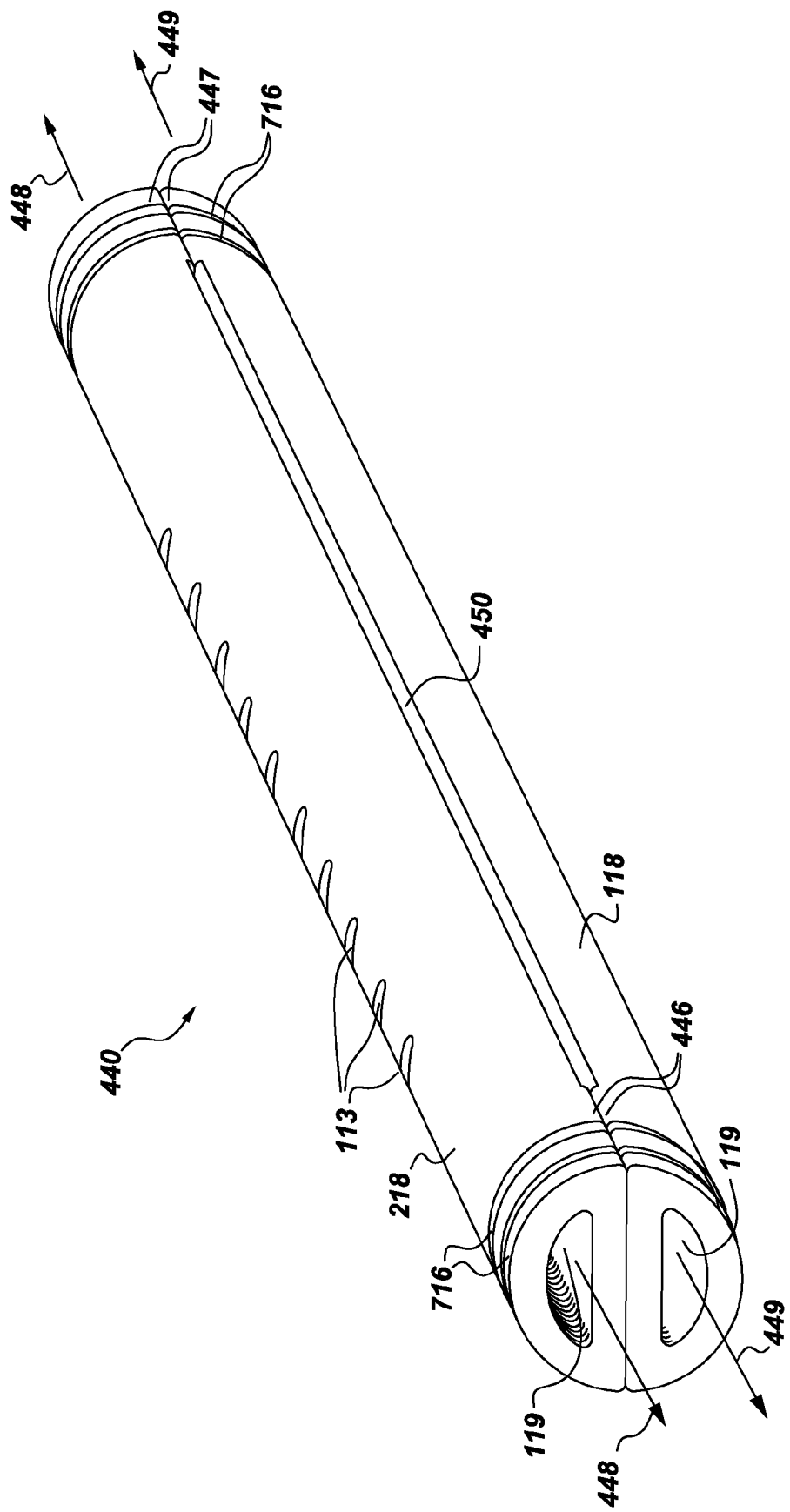
FIG. 11 illustrates a central core element which may be used in accordance with one or more embodiments of the invention.

Referring to FIG. 11, the figure represents an alternate embodiment of a central core element 440 in accordance with the present invention. The central core element 440 illustrated in FIG. 11 comprises a permeate exhaust conduit 118 and concentrate exhaust conduit 218 each of which is open at both ends. Each exhaust conduit defines a channel 119, openings 113 communicating with the channel, spacer elements 446 and 447 defining cavity 450, and grooves 716 adapted for securing an o-ring. During operation of a separator assembly comprising central core element 440 flow through exhaust conduits is bi-directional. Flow direction arrows 448 and 449 illustrate the direction of the flow of concentrate and permeate respectively during operation of a separator assembly comprising the central core element 440 illustrated in FIG. 11. Those of ordinary skill in the art will appreciate that pressurizable housing 405 shown in FIG. 9A can be modified readily as shown in FIG. 9B to accommodate a separator assembly comprising the central core element 440 illustrated in FIG. 11. Thus, a suitable pressurizable housing is shown in FIG. 9B wherein, coupling members 436 couple the ends of the central core element to dual channel exhaust outlets which separately conduct permeate and concentrate from the pressurizable housing, the dual channel outlets each comprising an outlet channel divider 439 and defining a permeate outlet channel 438 and a concentrate outlet channel 428, and preventing product permeate from coming into contact with by-product concentrate.

Figure 12:
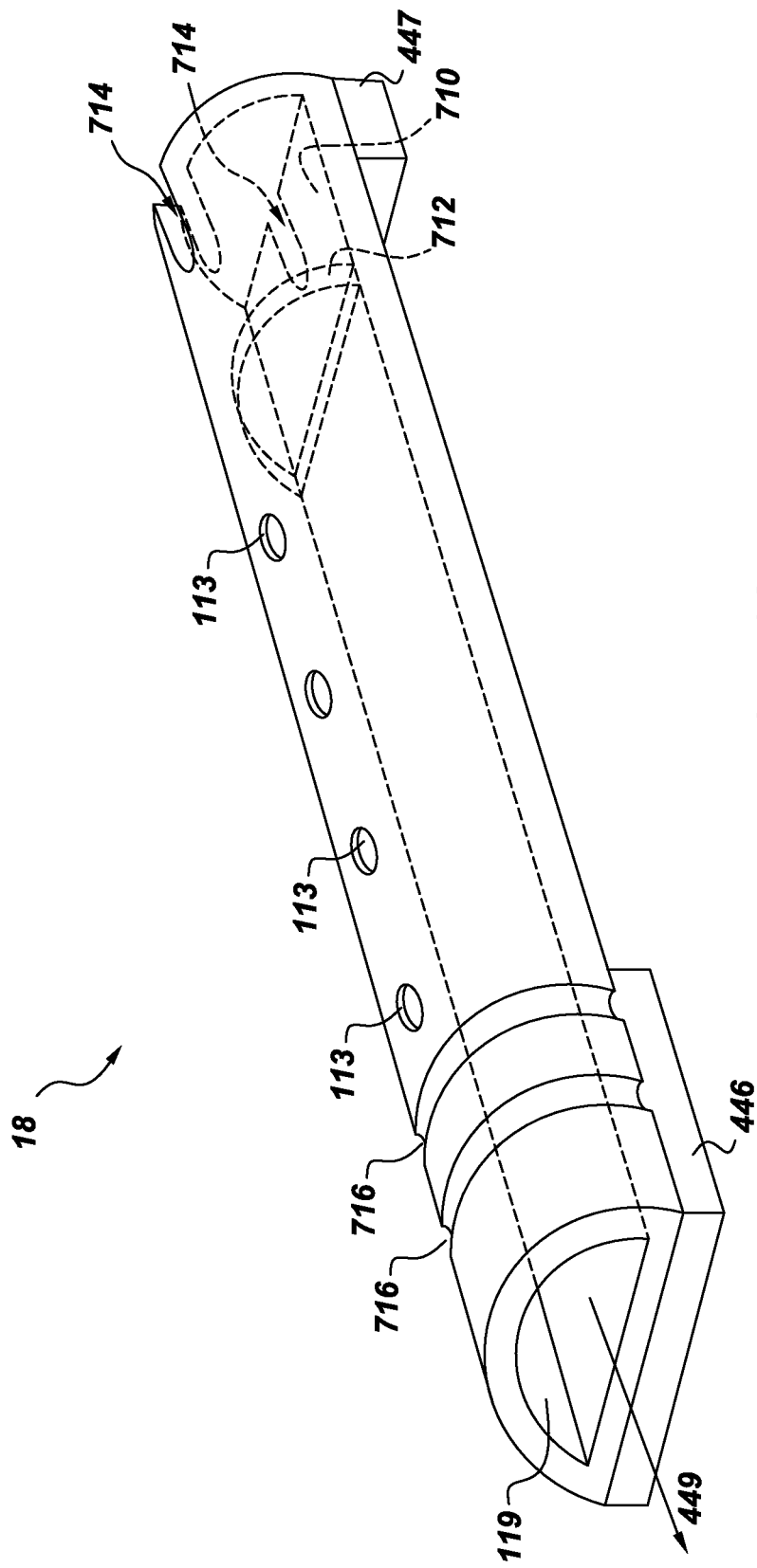
FIG. 12 illustrates a core element component which may be used in accordance with one or more embodiments of the invention.

Referring to FIG. 12, the figure represents a porous exhaust conduit 18 which may be used in accordance with one embodiment of the present invention. The porous exhaust conduit 18 may be either a permeate exhaust conduit or a concentrate exhaust conduit depending on the configuration of the membrane stack assembly employed. Porous exhaust conduit 18 defines an exhaust channel 119 which is blocked at one end by channel blocking element 712. In the embodiment shown, the porous exhaust conduit 18 comprises spacer elements 446 and 447 and defines a feed control cavity 710, feed control baffles 714, openings 113, and grooves 716 adapted for securing o-rings. In one embodiment, two porous exhaust conduits 18 are joined to provide a central core element defining a cavity configured to accommodate a first portion of a membrane stack assembly. Porous exhaust conduits 18 may be joined such that the spacer elements 446 and 447 of a first permeate exhaust conduit are aligned with the spacer elements 446 and 447 of a second, identical concentrate exhaust conduit. A first portion of a membrane stack assembly comprising at least one feed carrier layer, at least one permeate carrier layer, and at least one membrane layer is disposed within the cavity, and a second portion of the membrane stack assembly is wound around the central core element comprising the permeate exhaust conduit and the concentrate exhaust conduit to afford a wound structure which after appropriate sealing of the ends of the multilayer membrane assembly provides a separator assembly provided by the present invention. The separator assembly so produced may be inserted into a pressurizable housing such that the feed control cavities 710 are in fluid communication with a feed inlet of the pressurizable housing. During operation, a feed solution may be introduced through the feed inlet into feed control cavities 710. As the feed control cavities become filled excess feed emerges from the feed control baffles 714 and thereafter contacts a feed surface of the separator assembly. One of the purposes of the feed control cavities 710 is to prevent uncontrolled contact between the feed solution and the various surfaces of the separator assembly, particularly at start up. Grooves 716 adapted for securing o-rings may serve to join the porous exhaust conduits 18 at one end and may also to secure connection of the separator assembly 300 to a coupling member of the pressurizable housing. Those of ordinary skill in the art will appreciate that with respect to a separator assembly comprising a central core element comprising two identical porous exhaust conduits 18 shown in FIG. 12 that flow of both permeate and concentrate will be unidirectional in direction 449 as shown in FIG. 12. In addition, those of ordinary skill in the art will understand that a pressurizable housing configured as in FIG. 9A can be modified as follows to accommodate such a separator assembly. Thus, concentrate exhaust outlet 428 and porous exhaust outlet 438 would be located on the same end of the pressurizable housing, and feed inlet 410 would be located at the opposite end of the pressurizable housing to facilitate direct fluid communication between feed inlet 410 and feed control cavities 710. Appropriate couplings and outlet piping segmentation may be used to prevent contact between permeate and concentrate emerging from the same end of the separator assembly.

Figure 13:
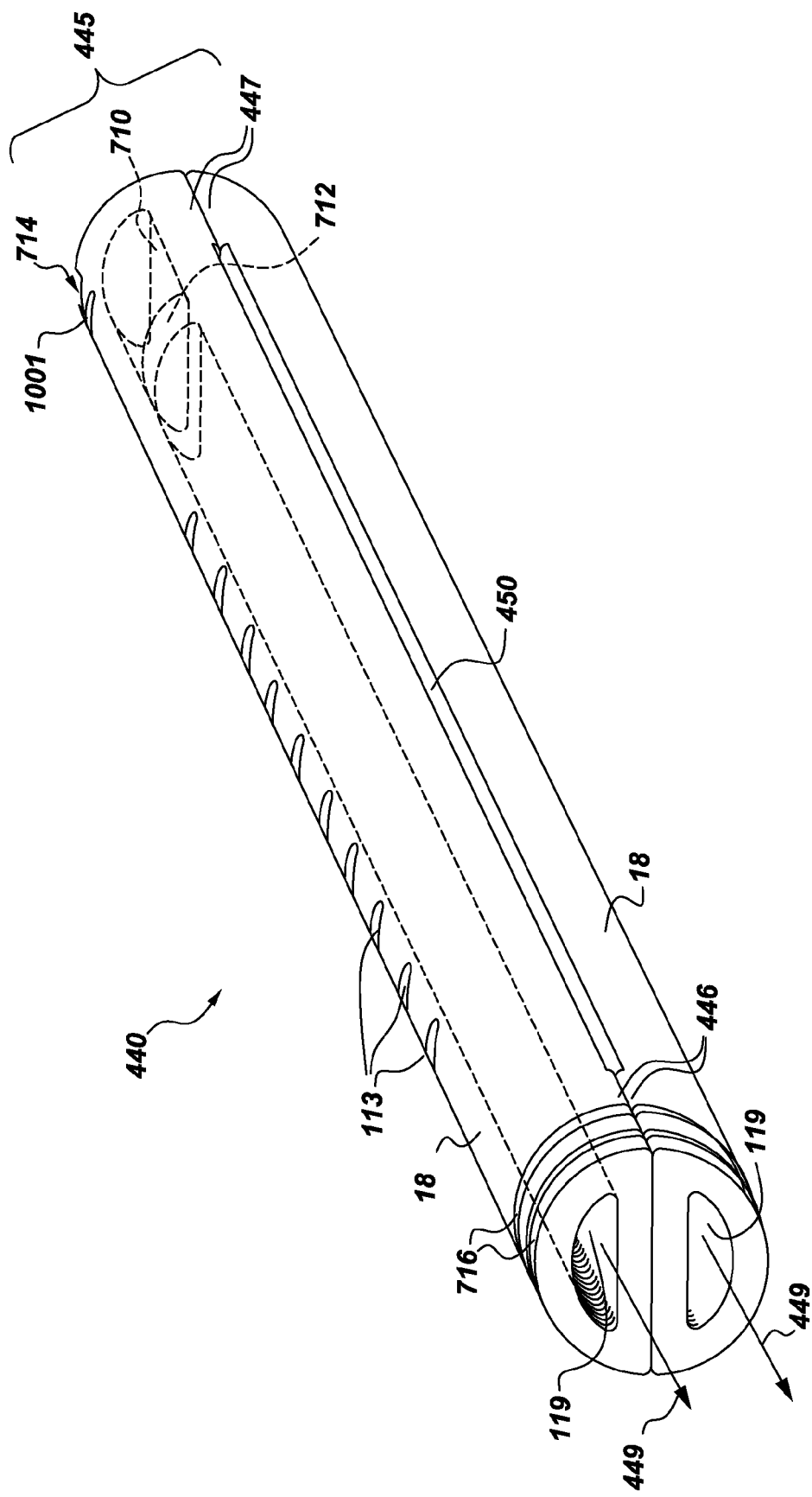
FIG. 13 illustrates a central core element which may be used in accordance with one or more embodiments of the invention.

Referring to FIG. 13, the FIG. 440 represents a three dimensional, partially cutaway view of a central core element which may be used in accordance with one or more embodiments of the invention. Central core element 440 comprises two identical porous exhaust conduits 18 and defines a cavity 450 which is configured to accommodate a first portion of a membrane stack assembly. The component porous exhaust conduits 18 of central core element 440 are essentially the same as that illustrated in FIG. 12 with the exception that the porous exhaust conduits illustrated in FIG. 13 comprise a feed control hole 1001 adjacent to feed control baffle 714. Central core element 440 comprises a blocked end 445 and an open end from which, during operation, permeate and concentrate emerge in direction 449. By "blocked end" it is meant that each of the porous exhaust conduit channels is blocked by a blocking element 712 such that permeate or concentrate can exit the porous exhaust conduit only at the end opposite the blocked end. Each of the porous exhaust conduits also defines a feed control cavity 710. Moreover, the membrane stack assembly can be configured such that the layers of the second portion of the membrane stack assembly may be disposed around the central core element such that no permeate or concentrate enters the feed control cavity 710.

Figure 14:
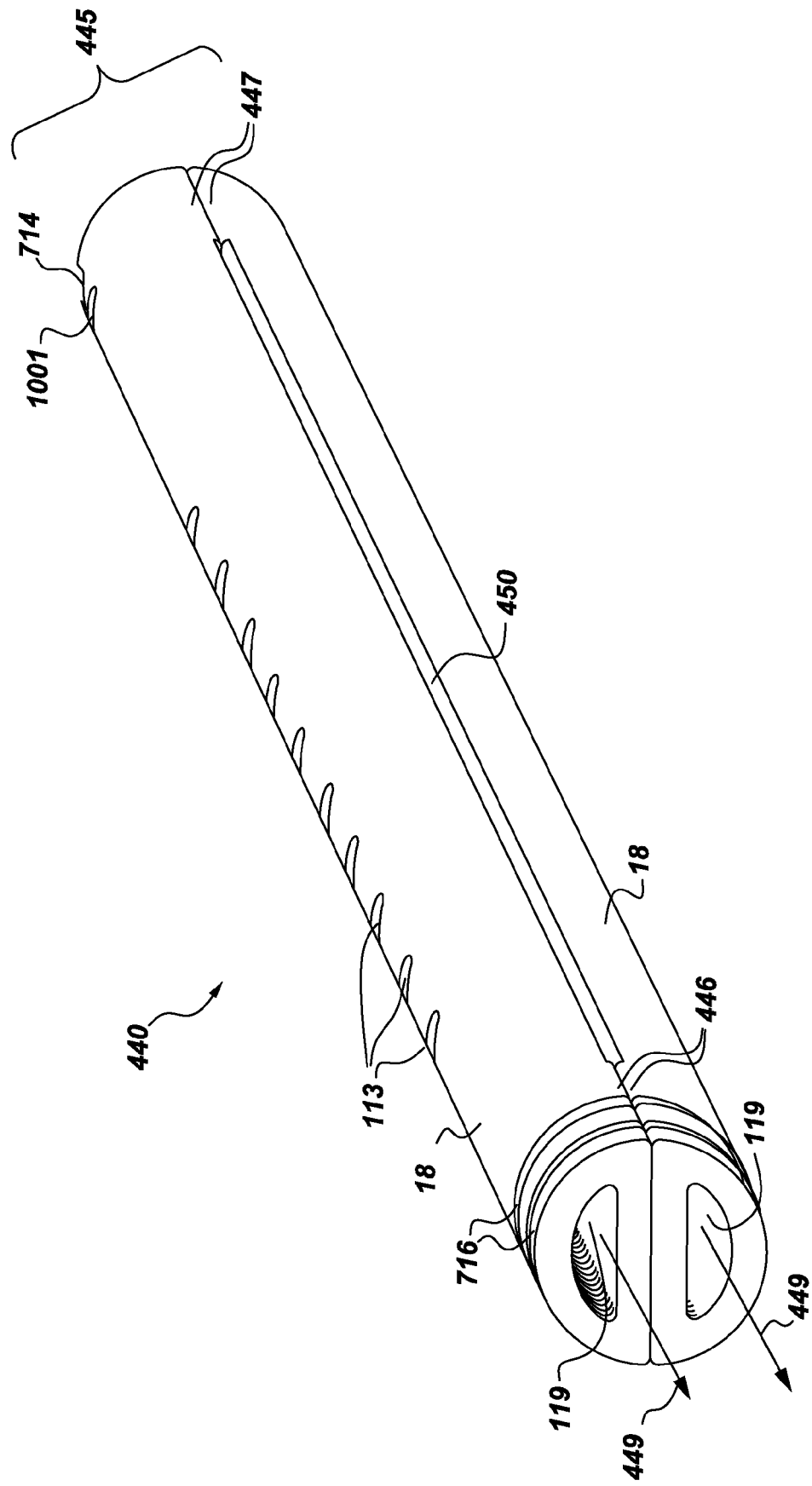
FIG. 14 illustrates a central core element which may be used in accordance with one or more embodiments of the invention.

Referring to FIG. 14, the figure represents a three dimensional solid view of a central core element 440 which may be used in accordance with one or more embodiments of the invention. The central core element is identical to that illustrated in FIG. 13.

Figure 15A:
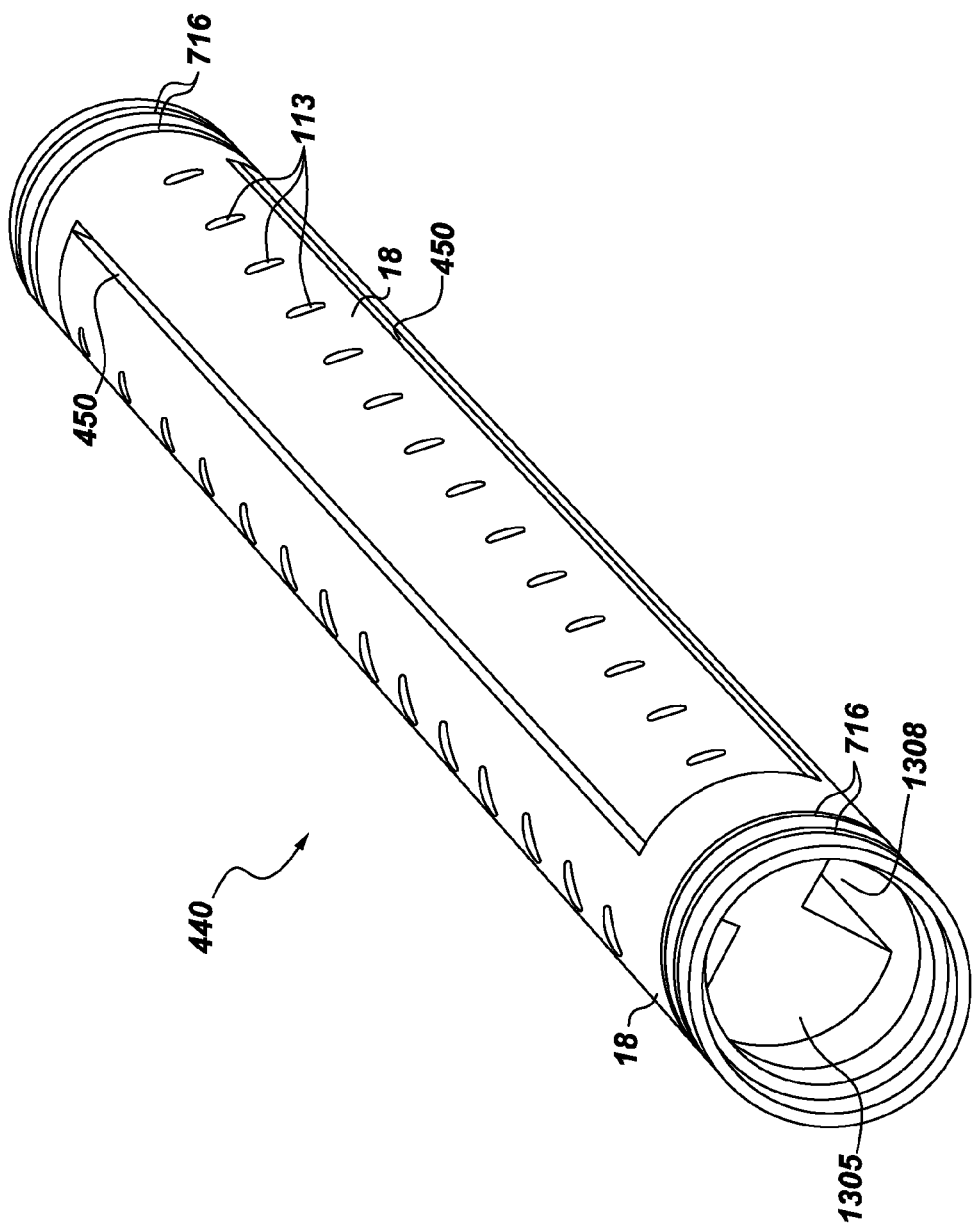
FIG. 15A, FIG. 15B and FIG. 15C illustrate a central core element which may be used in accordance with one or more embodiments of the present invention
Figure 15B:
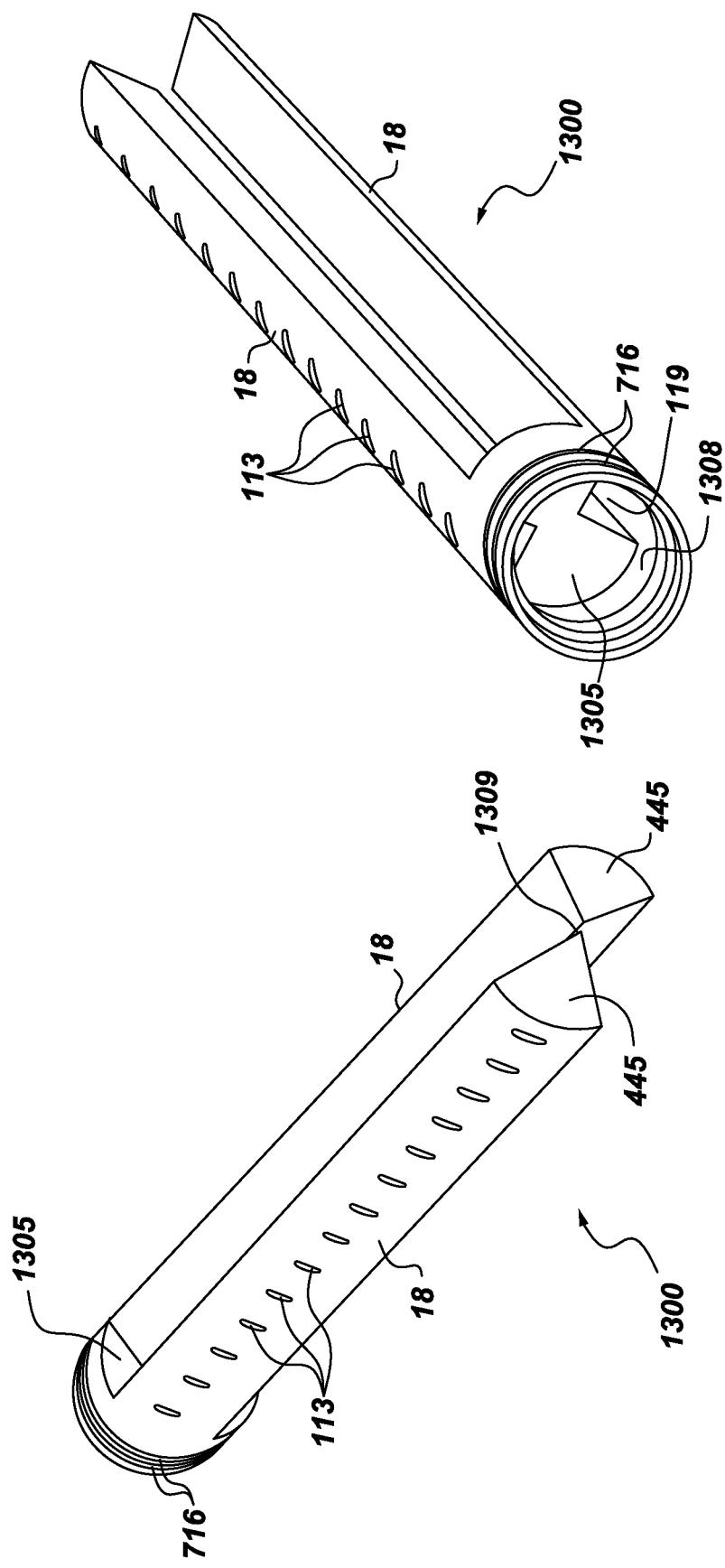
Figure 15C:
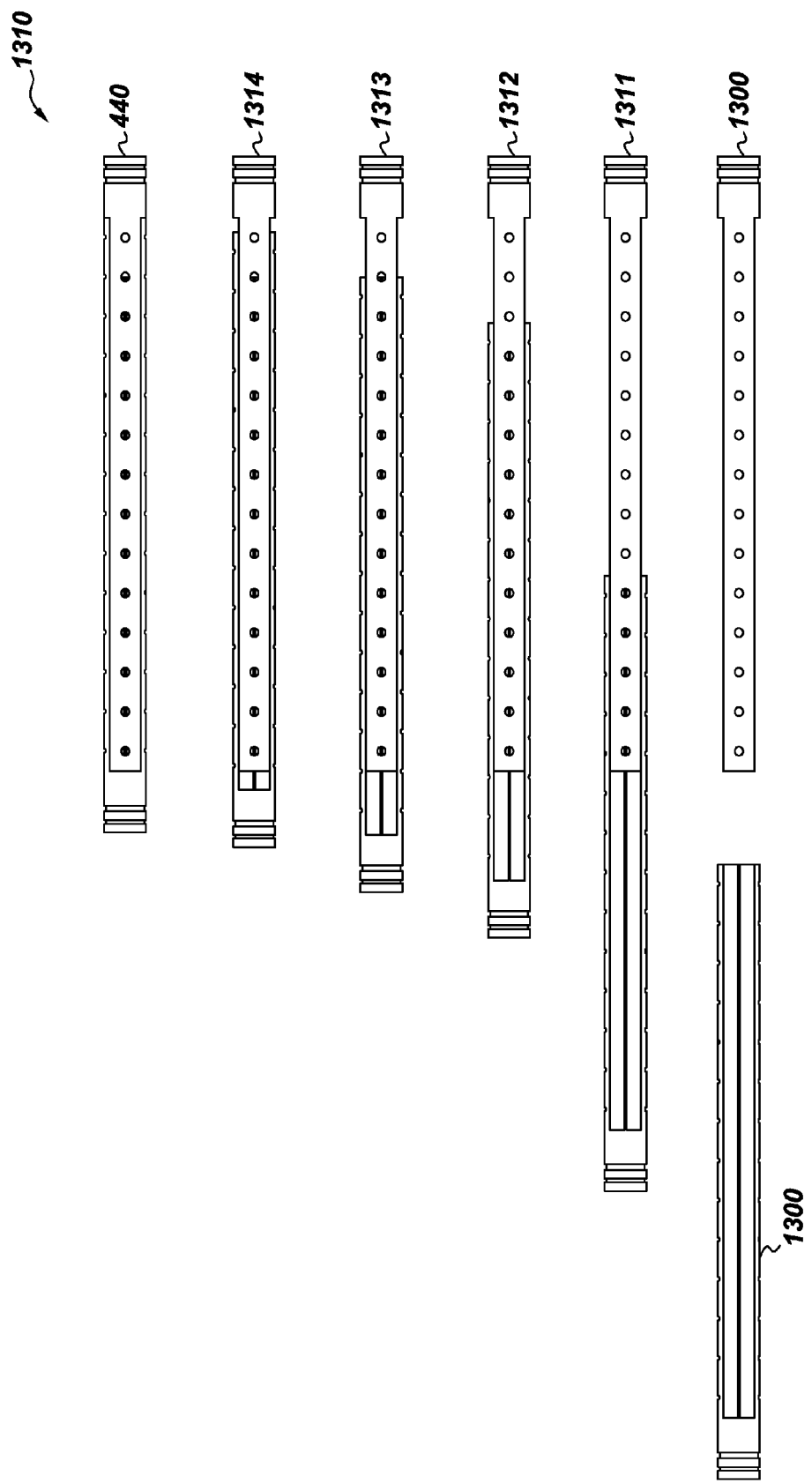

Referring to FIG. 15A, FIG. 15B and FIG. 15C, the FIG. 15A represents a central core element 440 which may be used in accordance with one or more embodiments of the invention. Central core element 440 comprises four porous exhaust conduits 18 configured such that during operation of a separator assembly comprising the central core element, flow through the exhaust channels of two of the porous exhaust conduits is in one direction while flow through the exhaust channels of the remaining two porous exhaust conduits is in the opposite direction. The central core element 440 illustrated in FIG. 15A comprises two identical central core element components 1300 (FIG. 15B) each comprising two porous exhaust conduits 18. The term "central core element component" is used interchangeably herein with the term "core element component". Central core element components 1300 are illustrated from two viewpoints in FIG. 15B. In a first viewpoint, central core element component 1300 is seen from closed ends 445 of the two porous exhaust conduits 18. The porous exhaust conduits 18 comprising central core element component 1300 are "quarter cylinder" in shape and define openings 113 and exhaust channels 119. The exhaust channels 119 share a common exit cavity 1308 defined by blocking member 1305 and the inner walls of the core element component in the area of the exit cavity. Other features of the central core element component 1300 illustrated in FIG. 15B include grooves 716 adapted for securing an o-ring. Unlike embodiments wherein an o-ring is indicated as securing one central core element component (or one porous exhaust conduit) to another, in the embodiment featured in FIG. 15A the o-rings suggested by the presence of grooves 716 are primarily intended to secure the central core element 440 to another component of an apparatus comprising a separator assembly 300 comprising central core element 440, for example the coupling member 446 of a pressurizable housing of a reverse osmosis apparatus. In one embodiment, the gap 1309 between the porous exhaust conduits 18 of a central core element component 1300 is slightly narrower at the closed end 445 than the open end of the central core element component. Under such circumstances, the porous exhaust conduits 18 of the central core element component 1300 are slightly biased toward one another. When two such central core element components 1300 are coupled together to form a central core element 440, this slight bias of the porous exhaust conduits acts to secure the two central core element components to each other without the need for additional securing means such as o-rings.

FIG. 15C illustrates a method 1310 of making the central core element 440 illustrated in FIG. 15A. First, a pair of identical central core element components 1300 is provided. In a first method step, 1311, the closed ends of the central core element components 1300 are engaged. In second, third and fourth method steps (1312-1314), the central core element components 1300 are progressively engaged to afford the central core element 440 in which the central core element components are fully engaged.

The central core element 440 illustrated in FIG. 15A may be used in accordance with one or more embodiments of the present invention wherein the porous exhaust conduits 18 define one or more cavities 450 between themselves which are configured to accommodate, and which accommodate, a first portion of a membrane stack assembly. For example, the four cavities 450 defined by the four porous exhaust conduits of the central core element 440 shown in FIG. 15A are in one embodiment configured to accommodate, and accommodate, the two separate membrane stack assemblies comprising a common feed carrier layer 116 as shown in FIG. 8. In the embodiment shown in FIG. 8 each membrane stack assembly comprises a permeate carrier layer 110, and a membrane layer 112 and shares a single feed carrier layer 116 common to both membrane stack assemblies. The central core element 440 shown in FIG. 15A defines a gap 1309 (Shown in FIG. 15B) between the porous exhaust conduits 18 of the individual core element components 1300. In one embodiment, gap 1309 accommodates a portion of two different membrane stack assemblies, and in the embodiment shown in FIG. 8 this includes a total of 3 membrane stack assembly layers, two membrane layers 112 contributed from each of a first membrane stack assembly and a second membrane stack assembly, and a feed carrier layer common to both the first and second membrane stack assemblies. Those of ordinary skill in the art will appreciate that alternate configurations of the first portions of the membrane stack assemblies within the cavities defined by central core element 440 are possible. In the embodiment shown in FIG. 15A, the cavities 450 and gap 1309 (FIG. 15B) are defined by the relative positions of the first and second sections of the core element components; the second section comprising the porous exhaust conduits and the first section to which the porous exhaust conduits are attached defining the common exit cavity. As noted, the exhaust channels 119 defined by the porous exhaust conduits 18 are in fluid communication with the common exhaust cavity 1308. In one embodiment, a first pair of cavities 450 and a first portion of gap 1309 may accommodate a first portion of a first membrane stack assembly 120 by threading one end of the membrane stack assembly into a first cavity 450 of the pair, through gap 1309 and through the second cavity 450 of the pair. In this embodiment the first portion of the first membrane stack assembly is accommodated by the pair of cavities 450 and a first portion of gap 1309. In order to complete the assembly, a second membrane stack assembly is threaded through a second pair of cavities 450 and a second portion of gap 1309 (i.e. a portion of gap 1309 not already occupied by a portion of the first membrane stack assembly. A completed separator assembly may be prepared by winding and sealing the assembly.

It should be noted that the foregoing discussion illustrates an inventive feature of one or more embodiments of the present invention. Namely, that the central core element 440 which may be used in accordance with one or more embodiments of the invention may be comprised of core element components (e.g. 1300) each of which is a single piece (a unitary whole) comprising a first section defining an exit cavity and a second section comprising one or more porous exhaust conduits. The first section defining the exit cavity also fixes the relative positions in space of the porous exhaust conduits such that in the assembled central core element, the porous exhaust conduits independently define one or more cavities between themselves which may accommodate a first portion of a membrane stack assembly. This cavity, configured to accommodate a first portion of a membrane stack assembly, is defined independently of any component which is not part of the central core element itself. Thus, the dimensions of the cavity are not determined by the dimensions of the membrane stack assembly, nor are the dimensions of the cavity determined by a transient relationship of the porous exhaust conduits to a fixed reference such as a holding jig. In addition, the fact that the central core element 440 may be comprised of core element components each of which is a single piece provides a number of advantages over multi-piece core element components; in particular ease of manufacture, inventorying and handling. In one embodiment, for example that shown in FIG. 15A, the central core element 440 is comprised of identical, single piece core element components 1300, a condition regarded as especially advantageous.

In one aspect, the central core element 440 illustrated in FIG. 15A can be described as comprising two identical core element components 1300, a first core element component and its complement core element component, each of which comprises two porous exhaust conduits 18. Two core element components 1300, each of which is a single piece, may be joined together as illustrated in FIG. 15C to form central core element 440 (FIG. 15A). In one embodiment, the core element components 1300 are joined together by friction couplings, the friction couplings being constituted (as described herein above) by a narrowing of gap 1309 between porous exhaust conduits 18 at closed end 445 relative to the opposite end of the gap (i.e. the gap terminus at blocking element 1305 of the first section of the core element component). This narrowing of gap 1309 may be accomplished by designing the core element component 1300 such that the porous exhaust conduits 18 are slightly biased towards each other in the region of the closed ends 445 of the porous exhaust conduits. This slight biasing of the porous exhaust conduits acts to secure (join) the two core element components 1300 to each other in the central core element 440 by means of friction between the first core element component and its complement core element component in the regions of the closed ends of the porous exhaust conduits adjacent to blocking members 1305 in the assembled central core element. Thus, each core element component comprises a friction coupling constituted by the end portion of porous exhaust conduits 18 in the region in which gap 1309 is at a minimum. When a first core element component 1300 is joined to its complement core element component 1300 to form the central core element 440, a pair of friction joints is created; the friction joints being constituted by the friction coupling of the first core element component in contact with the porous exhaust conduits of its core element component complement, and the friction coupling of the complement core element component in contact with the porous exhaust conduits of the first core element component.

Figure 16:
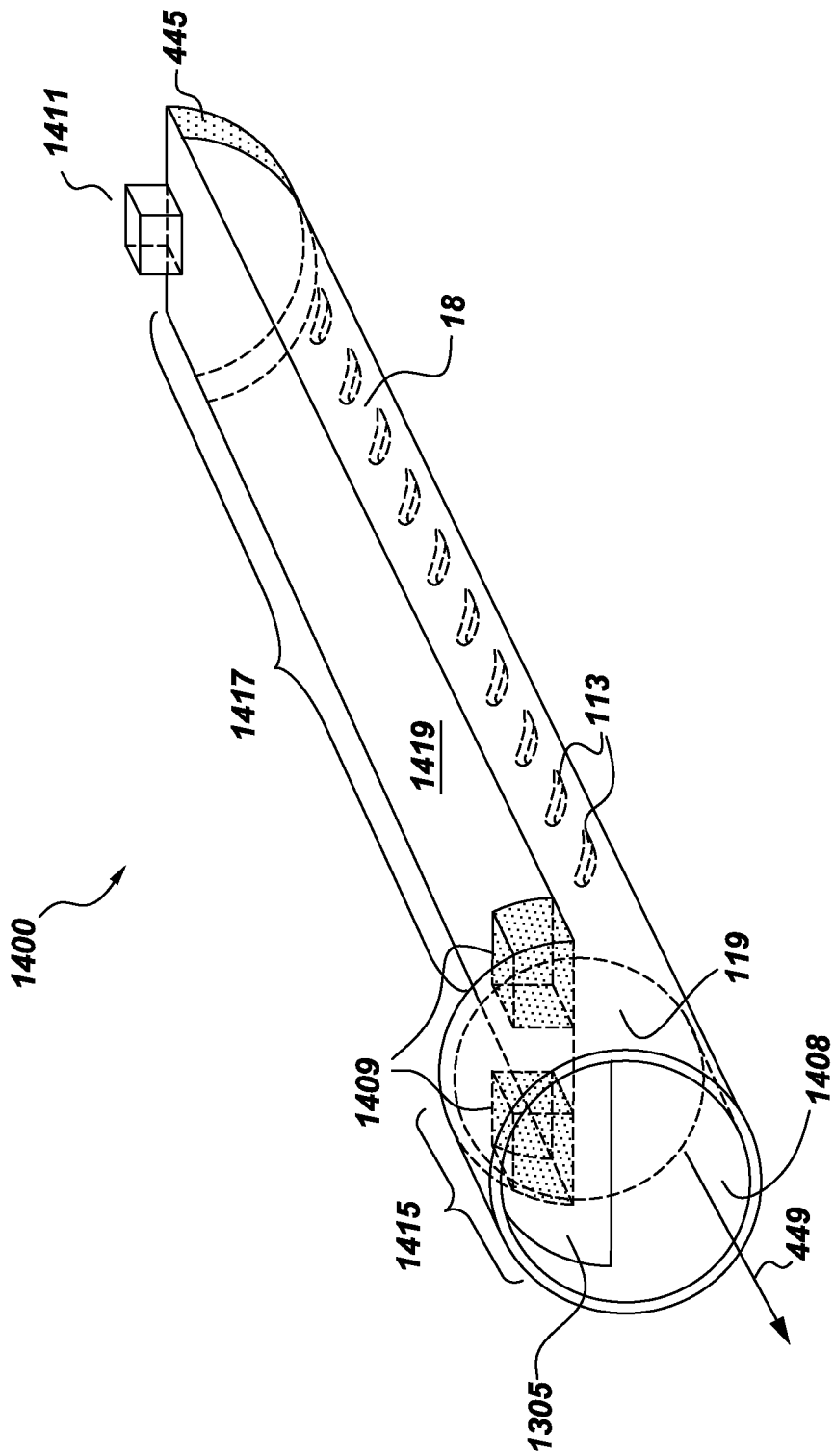
FIG. 16 illustrates a core element component which may be used in accordance with one or more embodiments of the invention.

Referring to FIG. 16, the figure represents a core element component 1400 which may be used to form a central core element 440 which may be used in accordance with one or more embodiments of the invention. The core element component comprises a first section 1415 defining an exit cavity 1408 and a second section 1417 comprising a porous exhaust conduit 18 defining an exhaust channel 119 in fluid communication with exit cavity 1408. The porous exhaust conduit 18 is closed at end 445. In the embodiment shown, the core element component 1400 comprises two friction couplings; a first friction coupling 1409 configured as an open mortise coupling, and a second friction coupling 1411 configured as a tenon coupling. In the embodiment shown, first section 1415 comprises a blocking member 1305 designed to prevent entry of fluid into exit cavity 1408 except via exhaust channel 119. Arrow 449 indicates the direction of fluid flow during operation of a separator assembly comprising a central core element 440 comprising core element component 1400.

Figure 17:
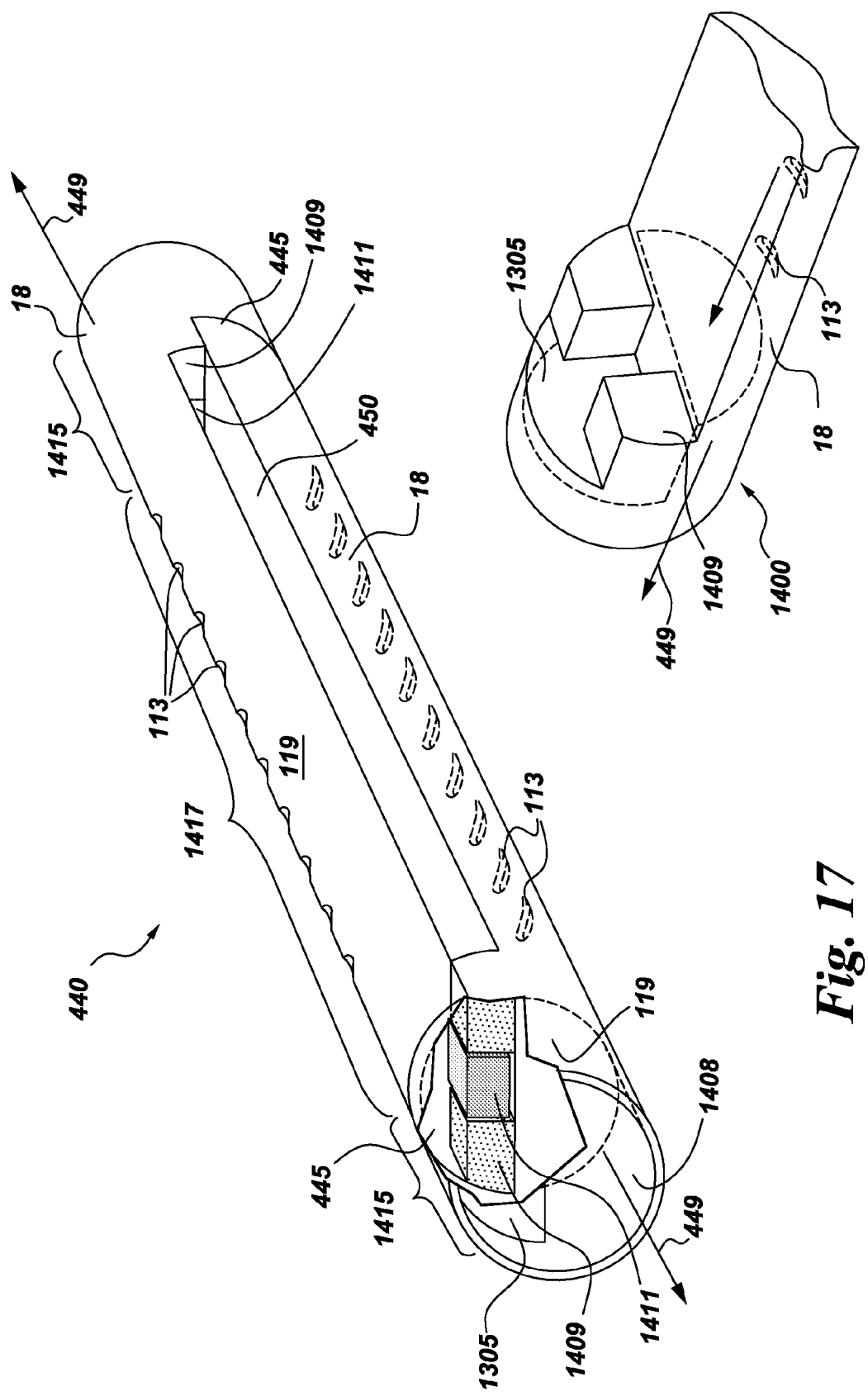
FIG. 17 illustrates a central core element which may be used in accordance with one or more embodiments of the invention.

Referring to FIG. 17, the figure represents a partial cutaway view of a central core element 440 comprising two identical core element components 1400 shown in FIG. 16. In addition the figure shows in detail a portion of an open mortise first friction coupling 1409. In the embodiment shown, the central core element 440 comprises two identical core element components 1400 joined together via friction joints comprised of open mortise friction couplings and tenon couplings inserted therein. When joined, together, the core element components 1400 form a central core element 440 which defines a cavity 450 between the porous exhaust conduits 18, the cavity 450 having dimensions suitable to accommodate a first portion of a membrane stack assembly, for example the membrane stack assembly 120 shown in FIG. 2A which comprises a permeate carrier layer 110, a membrane layer 112 and a carrier layer 116. This dimensional suitability of the cavity 450 to accommodate a first portion of a membrane stack assembly is at times referred to herein as being "configured to accommodate a first portion of a membrane stack assembly". The core element components can be designed to accommodate a first portion of any particular membrane stack assembly having any dimensions (e.g. a particular stack height and stack width) or other properties (e.g. membrane stack assembly compressibility, membrane stack assembly swelling properties, etc.) which may relate to the choice of cavity dimensions. In one embodiment, the height and width of the first and second friction couplings 1409 and 1411 may be varied to achieve a particular sized cavity 450. In the embodiment shown, a direction of fluid flow 449 through one of the two exhaust channels 119 defined by the porous exhaust conduits 18 and through the exit cavity 1408 during operation of a separator assembly comprising the central core element 440 is also shown.

Figure 18:
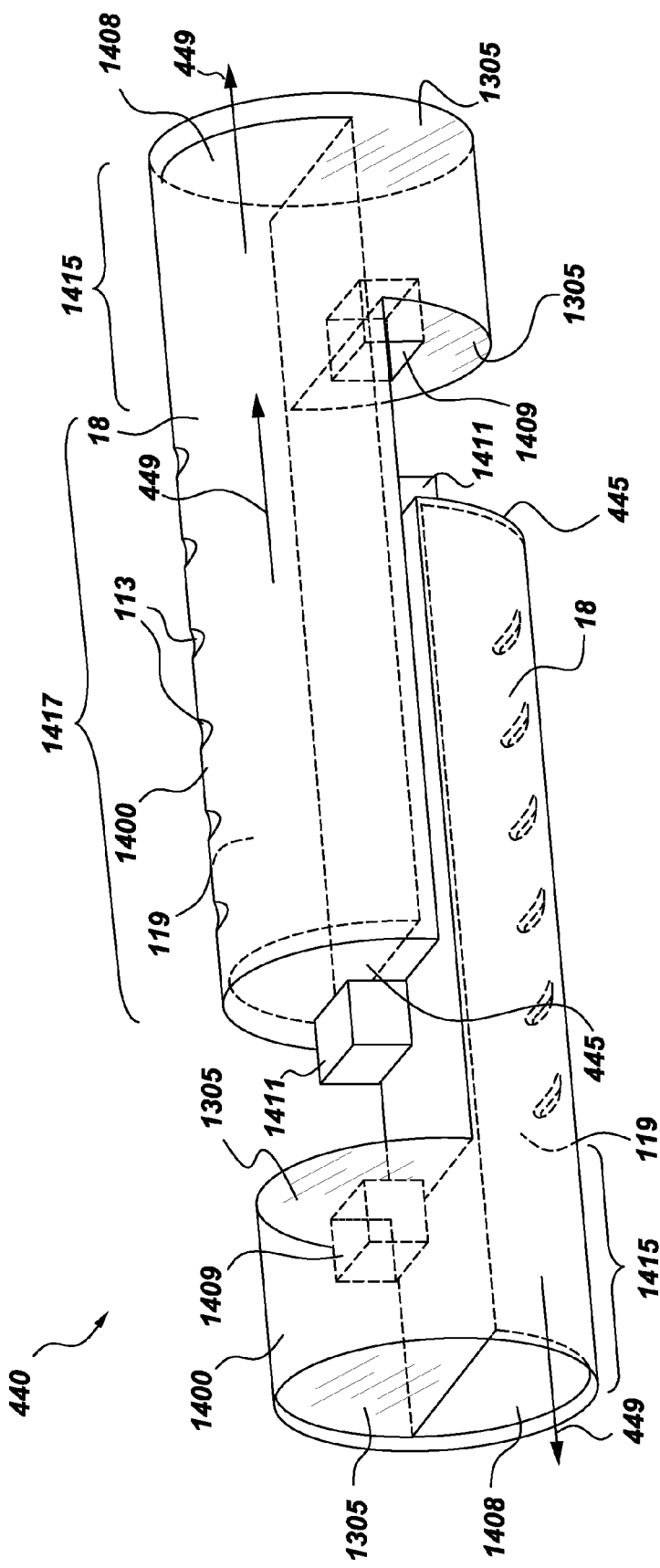
FIG. 18 illustrates a central core element which may be used in accordance with one or more embodiments of the invention.

Referring to FIG. 18, the figure represents an exploded view of a central core element 440 comprising two identical core element components 1400 each of which comprises a pair of friction couplings, a first closed mortise friction coupling 1409 defined by blocking member 1305 and a second tenon friction coupling 1411 in contact with closed end 445 of porous exhaust conduit 18.

Referring to FIG. 19, the figure represents a view of a core element component 1400 provided by the present invention comprising a first friction coupling 1409 which is the groove-like structure shown, and a second friction coupling 1411 which is a tongue-like structure. When two such core element components 1400 are engaged "head to tail" (See FIG. 22) the friction couplings 1409 and 1411 form a pair of tongue-and-groove friction joints. In the embodiment of core element component 1400 shown, a wall 1419 comprises part of the porous exhaust conduit 18. When two such core element components 1400 are engaged head to tail walls 1419 and end surfaces 1430 define a cavity 450 configured to accommodate a first portion of a membrane stack assembly. In the embodiment shown, the core element component 1400 comprises a first section 1415 and a second section 1417. First section 1415 defines the first friction coupling 1409 and exit cavity 1408 which is in fluid communication with the interior of the porous exhaust conduit 18. During operation of a separator assembly comprising a central core element 440 comprising the core element component 1400 illustrated in FIG. 19, flow through the exit cavity 1408 and porous exhaust conduit 18 is in a direction indicated by arrow 449. Although the core element component 1400 includes grooves 716 adapted for securing a pair of o-rings, such o-rings are not required to secure a pair of core element components 1400 together to form a central core element 440. As noted herein, such grooves 716 are primarily intended to secure the central core element 440 to another component of an apparatus, for example the coupling member 446 of a pressurizable housing of a reverse osmosis apparatus.

Referring to FIG. 20, the figure represents an opposite side view of the core element component 1400 shown in FIG. 19 and shows an outer surface of the porous exhaust conduit 18 which features openings 113 allowing fluid communication between the outer surface of the porous exhaust conduit and the exhaust channel 119 defined by the porous exhaust conduit which is in fluid communication with exit cavity 1408. In the view shown in FIG. 20, only the second friction coupling 1411 is visible.

Referring to FIG. 21, the figure represents complementary portions of two identical core element components 1400 each having a head end 1420 and a tail end 1422. When engaged head to tail, second friction coupling 1411 engages with first friction coupling 1409 to form one of a pair of friction joints 1424 present in the resultant central core element 440 shown in FIG. 22. In the embodiment shown in FIG. 21, first friction coupling 1409 is configured as a groove in the outer surface of first section 1415 into which section friction coupling 1411 may be inserted to form a friction joint, the outer surface of which joint may be flush with the outer surface of first section 1415. In the embodiment shown, first friction coupling 1409 is at least partially defined by groove-defining end surfaces 1430.

In the embodiment shown in FIG. 22, each of the core element components 1400 comprises a pair of friction couplings (a first groove coupling 1409 and a second tongue coupling 1411) engaged as friction joints 1424 in central core element 440. The central core element defines a cavity 450 which traverses the central core element around a center line (not shown), said cavity extending the length of the porous exhaust conduits 18. The cavity is sized appropriately such that the first portion of a membrane stack assembly fills the entire cavity but in a manner such that the first portion of the membrane stack assembly is not subjected to excessive compressive stress within the cavity. Thus, in one embodiment, the fit of the membrane stack assembly within the cavity should be such that the top, bottom and side surfaces of the first portion of the membrane stack assembly are in contact with the interior surfaces of the central core element defining the cavity 450; the groove-defining end surfaces 1430 and walls 1419, but not such that the first portion of the membrane stack assembly is subjected to excessive compressive stress either during assembly of a separator assembly comprising the central core element 440 or during operation of such a separator assembly. Excessive compressive stress is compressive stress that would substantially inhibit flow through or within one or more layers of the membrane stack assembly, or would be such that damage to one or more of the layers of the membrane stack assembly would result.

In one embodiment, the present invention provides a salt separator assembly comprising a membrane stack assembly comprising at least one feed carrier layer, at least one permeate carrier layer, and at least one salt-rejecting membrane layer, the salt-rejecting membrane layer being disposed between the feed carrier layer and the permeate carrier layer. The salt separator assembly further comprises a central core element comprising at least one concentrate exhaust conduit and at least one permeate exhaust conduit wherein the concentrate exhaust conduit and the permeate exhaust conduit define a cavity configured to accommodate a first portion of the membrane stack assembly. A second portion of the membrane stack assembly forms a multilayer membrane assembly disposed around the central core element. The feed carrier layer is in contact with the concentrate exhaust conduit and is not in contact with the permeate exhaust conduit. The permeate carrier layer is in contact with the permeate exhaust conduit and is not in contact with the concentrate exhaust conduit. The permeate carrier layer does not form an outer surface of the salt separator assembly.

In one embodiment, the salt separator assembly comprises a multilayer membrane assembly which is radially disposed about the central core element. In another embodiment, the salt-rejecting membrane layer comprises a functionalized surface and an unfunctionalized surface. In one embodiment, the salt separator assembly comprises a plurality of concentrate exhaust conduits. In another embodiment, the salt separator assembly comprises a plurality of permeate exhaust conduits. In yet another embodiment, the salt separator assembly comprises a plurality of feed carrier layers, and in an alternate embodiment, the salt separator assembly comprises a plurality of permeate carrier layers. The salt separator assembly may comprise a plurality of salt-rejecting membrane layers.

In yet another embodiment, the present invention provides a spiral flow reverse osmosis membrane apparatus comprising (a) a pressurizable housing and (b) a separator assembly. The separator assembly comprises a membrane stack assembly comprising at least one feed carrier layer, at least one permeate carrier layer, and at least one membrane layer, the membrane layer being disposed between the feed carrier layer and the permeate carrier layer. The separator assembly also comprises a central core element comprising at least one concentrate exhaust conduit and at least one permeate exhaust conduit. The central core element defines a cavity configured to accommodate a first portion of the membrane stack assembly. A second portion of the membrane stack assembly forms a multilayer membrane assembly disposed around the central core element. The feed carrier layer is in contact with the concentrate exhaust conduit and is not in contact with the permeate exhaust conduit. The permeate carrier layer is in contact with the permeate exhaust conduit and is not in contact with the concentrate exhaust conduit. Moreover, the permeate carrier layer does not form an outer surface of the separator assembly. The pressurizable housing comprises at least one feed inlet configured to provide feed solution to an outer feed surface of the separator assembly. The pressurizable housing comprises at least one permeate exhaust outlet coupled to the permeate exhaust conduit, and at least one concentrate exhaust outlet coupled to the concentrate exhaust conduit. The pressurizable housing may be made of suitable material or materials known to one of ordinary skill in the art. For example, the pressurizable housing may be made of a polymeric organic material, stainless steel, aluminum, glass, or a combination thereof. The feed inlet is connected to the pressurizable housing to enable input of the feed to the separator assembly. In one embodiment, the pressurizable housing comprises the thermoplastic ABS. In an alternate embodiment, the pressurizable housing comprises polycarbonate.

In one embodiment, the present invention provides a spiral flow reverse osmosis membrane apparatus comprising (a) a pressurizable housing and (b) a separator assembly provided by the present invention wherein the multilayer membrane assembly is radially disposed around the central core element. In an alternate embodiment, the present invention provides a spiral flow reverse osmosis membrane apparatus comprising (a) a pressurizable housing and (b) a plurality of separator assemblies provided by the present invention.

In still yet another embodiment, the present invention provides a method for making a separator assembly, the method comprising: providing a central core element comprising at least one concentrate exhaust conduit and at least one permeate exhaust conduit; disposing a first portion of a membrane stack assembly comprising at least one permeate carrier layer, at least one feed carrier layer, and at least one membrane layer within a cavity independently defined by the central core element such that the concentrate exhaust conduit and permeate exhaust conduit are separated by the first portion of the membrane stack assembly; and radially disposing a second portion of the membrane stack assembly around the central core element, and sealing a resultant wound assembly to provide a separator assembly wherein the concentrate exhaust conduit is not in contact with the permeate exhaust conduit, and wherein the feed carrier layer is in contact with the concentrate exhaust conduit and not in contact with the permeate exhaust conduit, and wherein the permeate carrier layer is in contact with the permeate exhaust conduit and not in contact with the concentrate exhaust conduit, and wherein the permeate carrier layer does not form an outer surface of the separator assembly.

In the present example, the expression "radially disposing a second portion of the membrane stack assembly around the central core element, and sealing a resultant wound assembly to provide a separator assembly" refers to the acts of winding the second portion of the membrane stack assembly around the central core element, applying sealing portions to the ends of the membrane stack assembly, for example sealing portions 316 and 317 of FIG. 3, and sealing the ends of the wound structure (e.g. the first and second surfaces of a cylindrical separator assembly), for example by dipping the ends of the wound structure in an epoxy sealant followed by curing.

In various embodiments, the separator assembly can be made using the procedures and concepts discussed herein and in the FIGS. 2-22. The methods disclosed herein afford separator assemblies in which folding of the membrane layer is avoided while providing for spiral flow of feed solution and permeate toward the concentrate exhaust conduit and permeate exhaust conduit disposed within the multilayer membrane assembly of the separator assembly. Other advantages, such as the decreased reliance on sealing portions relative to conventional separator assemblies, redound to the value of the various embodiments of the present invention disclosed herein. Those of ordinary skill in the art will appreciate that the present invention provides novel separator assemblies which can be operated without causing feed solution to flow along the axis of the multilayer membrane assembly (in a cross flow direction through the assembly). The separator assemblies provided by the present invention can be operated by introducing feed solution to the entire outer surface of the separator assembly thus minimizing the tendency of the separator assembly to telescope along its axis.

The separator assemblies provided by the present invention are especially useful for the separation of one or more solutes from a feed solution. In one embodiment, a separator assembly provided by the present invention is used to separate salt from seawater. In an alternate embodiment, the separator assembly provided by the present invention is used to separate a mixture of salt and organic contaminants from brackish water. Various feed solutions that may be advantageously separated into a permeate and a concentrate include seawater, brackish water, raw milk, food processing liquids, cooling tower effluent, municipal water treatment plant effluent, and municipal water sources such as river water, reservoir water and the like.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A separator assembly comprising:
    (a) a central core element comprising at least one permeate exhaust conduit and at least one concentrate exhaust conduit,
    each of said exhaust conduits defining an exhaust channel and one or more openings which allow fluid communication between an exterior surface of the exhaust conduit and the exhaust channel,
    said exhaust conduits comprising at least one spacer element defining a cavity between said exhaust conduits,
    said cavity being configured to accommodate a first portion of a membrane stack assembly; and
    (b) a membrane stack assembly comprising at least one feed carrier layer, at least one permeate carrier layer, and at least one membrane layer;
    wherein said first portion of the membrane stack assembly is disposed within the cavity defined by the exhaust conduits, and
    wherein a second portion of the membrane stack assembly forms a multilayer membrane assembly disposed around the central core element.

2. The separator assembly according to claim 1, wherein at least one of the exhaust conduits is selected from the group consisting of porous half-octagon shaped tubes, porous half-decahedron shaped tubes, and porous half tetradecahedron shaped tubes.

3. The separator assembly according to claim 1, wherein all said exhaust conduits have identical shapes.

4. The separator assembly according to claim 1 comprising at least four exhaust conduits.

5. The separator assembly according to claim 1, wherein at least one of said exhaust conduits comprises a blocking element.

6. The separator assembly according to claim 1, wherein the exhaust conduits define one or more grooves configured to secure an o-ring.

7. The separator assembly according to claim 1, wherein the central core element defines at least two cavities configured to accommodate a first portion of a membrane stack assembly.

8. A separator assembly comprising:
    (a) a central core element comprising at least one permeate exhaust conduit and at least one concentrate exhaust conduit,
    each of said exhaust conduits defining an exhaust channel and one or more openings which allow fluid communication between an exterior surface of the exhaust conduit and the exhaust channel,
    said exhaust conduits independently defining a cavity between said exhaust conduits,
    said cavity being configured to accommodate a first portion of a membrane stack assembly; and
    (b) a membrane stack assembly comprising at least one feed carrier layer, at least one permeate carrier layer, and at least one membrane layer;
    wherein said first portion of the membrane stack assembly is disposed within the cavity defined by the exhaust conduits, and
    wherein a second portion of the membrane stack assembly forms a multilayer membrane assembly disposed around the central core element.

9. The separator assembly according to claim 8, wherein at least one of the exhaust conduits is selected from the group consisting of porous half-octagon shaped tubes, porous half-decahedron shaped tubes, and porous half tetradecahedron shaped tubes.

10. The separator assembly according to claim 8, wherein all said exhaust conduits have identical shapes.

11. The separator assembly according to claim 8, wherein at least one of said exhaust conduits comprises a blocking element.

12. A spiral flow reverse osmosis apparatus comprising:
    (a) a pressurizable housing; and
    (b) a separator assembly comprising: (i) a central core element comprising at least one permeate exhaust conduit and at least one concentrate exhaust conduit, each of said permeate exhaust conduit and concentrate exhaust conduit defining an exhaust channel and one or more openings which allow fluid communication between an exterior surface of the exhaust conduit and the exhaust channel, said permeate exhaust conduit and said concentrate exhaust conduit comprising at least one spacer element defining a cavity between said permeate exhaust conduit and said concentrate exhaust conduit, said cavity being configured to accommodate a first portion of a membrane stack assembly; and (ii) a membrane stack assembly comprising at least one feed carrier layer, at least one permeate carrier layer, and at least one membrane layer;
    wherein said first portion of the membrane stack assembly is disposed within said cavity, and
    wherein a second portion of the membrane stack assembly forms a multilayer membrane assembly disposed around the central core element.

13. The spiral flow reverse osmosis membrane apparatus according to claim 12, comprising a plurality of separator assemblies.

14. A separator assembly according to claim 12, wherein at least one of the exhaust conduits is selected from the group consisting of porous half-octagon shaped tubes, porous half-decahedron shaped tubes, and porous half-tetradecahedron shaped tubes.

* * * * *